United States Patent
Park et al.

(10) Patent No.: US 10,491,286 B2
(45) Date of Patent: Nov. 26, 2019

(54) METHOD AND SYSTEM FOR DIGITAL-ANALOG HYBRID BEAMFORMING IN MILLIMETER WAVE DOWNLINK CHANNEL

(71) Applicant: KOREA ADVANCED INSTITUTE OF SCIENCE AND TECHNOLOGY, Daejeon (KR)

(72) Inventors: Hyuncheol Park, Daejeon (KR); Girim Kwon, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 0 days.

(21) Appl. No.: 16/209,439

(22) Filed: Dec. 4, 2018

(65) Prior Publication Data
US 2019/0109629 A1    Apr. 11, 2019

Related U.S. Application Data

(63) Continuation of application No. PCT/KR2016/013962, filed on Nov. 30, 2016.

(30) Foreign Application Priority Data

Jun. 30, 2016    (KR) .................. 10-2016-0082505

(51) Int. Cl.
*H04B 7/06*    (2006.01)
*H04B 17/336*    (2015.01)
(Continued)

(52) U.S. Cl.
CPC ......... *H04B 7/0686* (2013.01); *H04B 7/0452* (2013.01); *H04B 7/0456* (2013.01);
(Continued)

(58) Field of Classification Search
CPC .. H04B 7/0686; H04B 7/0632; H04B 7/0626; H04B 7/0452; H04B 7/0617;
(Continued)

(56) References Cited

U.S. PATENT DOCUMENTS

2013/0301454 A1* 11/2013 Seol ................. H04B 7/043
370/252
2014/0146863 A1* 5/2014 Seol ................. H04B 7/0456
375/224

(Continued)

FOREIGN PATENT DOCUMENTS

KR    1020130017567    2/2013
KR    1020160009027 A    1/2016
(Continued)

OTHER PUBLICATIONS

Theodore S. Rappaport et al.: Millimeter Wave Mobile Communications for 5G Cellular: It Will Work!; vol. 1, 2013; IEEE Access, NYU Wireless, Polytechnic Institute of New York University, New York, NY 11201, USA.
(Continued)

*Primary Examiner* — Siu M Lee
(74) *Attorney, Agent, or Firm* — Heslin Rothenberg Farley & Mesiti, P.C.

(57) ABSTRACT

Disclosed is a method and system for digital-analog hybrid beamforming in a millimeter wave downlink channel. A hybrid beamforming method in a downlink channel with respect to at least one user terminal belonging to a transmission apparatus includes receiving feedback information from each of the at least one user terminal; selecting at least one user terminal for transmitting a transmission signal based on the received feedback information; performing digital beamforming with respect to the selected at least one user terminal; and performing analog beamforming with respect to the selected at least one user terminal based on a
(Continued)

prestored codebook. The codebook includes a desired number of subsets calculated based on a number of transmit antennas and a number of radio frequency (RF) chains, and each of the subsets includes a number of beamforming vectors corresponding to the number of RF chains.

17 Claims, 16 Drawing Sheets

(51) Int. Cl.
  *H04B 7/0456* (2017.01)
  *H04B 7/08* (2006.01)
  *H04B 7/0452* (2017.01)
(52) U.S. Cl.
  CPC ......... *H04B 7/0617* (2013.01); *H04B 7/0626* (2013.01); *H04B 7/0632* (2013.01); *H04B 7/0857* (2013.01); *H04B 7/0868* (2013.01); *H04B 17/336* (2015.01)
(58) Field of Classification Search
  CPC .. H04B 7/0868; H04B 7/0857; H04B 7/0456; H04B 17/336
  See application file for complete search history.

(56) References Cited

U.S. PATENT DOCUMENTS

| 2015/0103934 | A1 | 4/2015 | Nam et al. |
| 2015/0282122 | A1* | 10/2015 | Kim ................... H04L 25/03898 370/329 |
| 2018/0227022 | A1* | 8/2018 | Kim ..................... H04B 7/0478 |

FOREIGN PATENT DOCUMENTS

| KR | 2018004080 A1 | 1/2018 |
| WO | 2011038530 A1 | 4/2011 |
| WO | 2016024788 A1 | 2/2016 |

OTHER PUBLICATIONS

El Ayach et al.: Spatially Sparse Precoding in Millimeter Wave MIMO Systems; vol. 13, No. 3, Mar. 2014; IEEE.
M.E. Eltayeb et al.: Opportunistic Beam Training with Hybrid Analog/Digital Codebooks for mmWave Systems; GlobalSIP 2015—Symposium on Massive MIMO and Full-Dimension MIMO (FD-MIMO) Communications.
International Search Report, dated Mar. 23, 2017.

* cited by examiner

METHOD AND SYSTEM FOR DIGITAL-ANALOG HYBRID BEAMFORMING IN MILLIMETER WAVE DOWNLINK CHANNEL

CROSS-REFERENCE TO RELATED APPLICATION

This is a continuation application of International Application No. PCT/KR2016/013962, filed on Nov. 30, 2016, which claims the priority benefit of Korean Patent Application No. 10-2016-0082505, filed on Jun. 30, 2016, in the Korean Intellectual Property Office, both of which are hereby incorporated herein by reference in their entireties.

FIELD OF THE INVENTION

The following description of example embodiments relates to a space division multiple access (SDMA) technique for digital-analog hybrid beamforming in a millimeter wave downlink channel. This work was supported by Institute for Information & communications Technology Promotion (IITP) grant funded by the Korea government (MSIT) (2017-0-00765, 200 Gbps MIMO RF Front-end for High Rate Proximity Communication).

DESCRIPTION OF THE RELATED ART

Currently, frequency resources of 6 gigahertz (GHz) or less used in a 4G cellular system are insufficient to cope with exponentially increasing data traffic. Thus, millimeter wave (30 GHz to 300 GHz) communication technology capable of providing broadband frequency resources is popular as one of candidate technologies for the next generation mobile communication system.

Since a millimeter wave channel undergoes high path attenuation due to frequency characteristics, there is a need for beamforming technology that may acquire a signal-to-noise (SNR) gain in a desired direction using a large number of antennas. Also, since a millimeter wave signal has a short wavelength, it is possible to integrate the large number of antennas on a narrow area.

A multi-antenna system uses the same number of radio frequency (RF) chains as a number of antennas. Here, hundreds of milliwatts (mW) of power is consumed per RF chain. Therefore, dozens to hundreds of antennas require unrealistically high power and hardware cost. Further, since many dimensions of signals are used, difficulties arise in terms of signal processing technology. For example, an RF chain may include an oscillator, an analog-to-digital converter, a digital-to-analog converter, a power amplifier, a pulse shaping filter, and the like. To overcome such high hardware cost and difficulties arising in signal processing technology, digital-analog hybrid beamforming technology capable of significantly reducing a number of RF channels while using a large number of antennas is required.

Technology for hybrid beamforming in a millimeter wave channel environment is described in the following non-patent documents, [1] T. S. Rappaport, S. Sun, R. Mayzus, H. Zhao, Y. Azar, K Wang, G. N. Wong, J. K. Schulz, M. Samimi, and F. Gutierrez, "*Millimeter wave mobile communications for 5G cellular: It will work!,*" IEEE Access, vol. 1, pp. 335-349, May 2013, and [2] O. El Ayach, S. Rajagopal, S. Abu-Surra, Z. Pi, and R. W. Heath, Jr., "*Spatially sparse precoding in millimeter wave MIMO systems,*" IEEE Trans. Wireless Commun., vol. 13, no. 3, pp. 1499-1513, January 2014.

Space division multiple access (SDMA) refers to access technology in which users are classified based on spatial resources and share the same frequency and time resources. The SDMA is classified into a frequency division multiple access (FDMA) and a time division multiple access (TDMA) in which users are classified based on frequency and time resources, respectively. Many standardization organizations classify millimeter wave communication used in the next generation mobile communication system as technology suitable for small cells due to a short propagation distance. In particular, a small cell is installed in an urban area environment in which many users are densely present, such as, for example, a café, an airport, a stadium, and a building forest. Thus, the above communication technology is required to increase the transmission capacity of the entire cell. To support a large number of users in the urban area environment in which many users are densely present, a scheduling scheme for selecting an appropriate user and determining which beam to use to transmit a signal of which user per transmission is required.

Accordingly, there is a need for SDMA technology that may form an appropriate beam and simultaneously support a plurality of users in a millimeter wave channel environment having a limited number of RF chains.

SUMMARY

At least one example embodiment provides technology that may perform beamforming at a base station in a millimeter wave channel environment and may reduce an amount of power consumed and hardware cost by reducing a number of radio frequency (RF) chains while using a large number of antennas and by performing digital-analog hybrid beamforming.

Also, at least one example embodiment provides technology that may simultaneously support a plurality of users and increase the transmission capacity of the entire cell by performing beamforming with respect to user terminals densely belonging to a small cell in a millimeter wave channel environment.

According to an aspect of at least one example embodiment, there is provided a hybrid beamforming method in a downlink channel with respect to at least one user terminal belonging to a transmission apparatus, the method including receiving feedback information from each of the at least one user terminal; selecting at least one user terminal for transmitting a transmission signal based on the received feedback information; performing digital beamforming with respect to the selected at least one user terminal; and performing analog beamforming with respect to the selected at least one user terminal based on a prestored codebook. The codebook includes a desired number of subsets calculated based on a number of transmit antennas and a number of RF chains, and each of the subsets includes a number of beamforming vectors corresponding to the number of RF chains.

The number of RF chains for analog beamforming may be less than or equal to the number of transmit antennas.

Each of the beamforming vectors may have a dimension of the number of transmit antennas×1.

The performing of the digital beamforming may include performing the digital beamforming based on an identity matrix, in response to the downlink channel being a millimeter wave channel.

The receiving of the feedback information may include receiving feedback on effective channel information from user terminals selected from the user terminals in response to the downlink channel being a channel in which inter-user interference is present.

The performing of the digital beamforming may include generating a digital beamforming matrix for cancelling interference between the user terminals based on one of digital linear precoding and non-linear digital precoding using the fed back effective channel information and performing the digital beamforming based on the generated digital beamforming matrix.

The beamforming vectors may be configured to form a beam pattern at the same interval that is calculated based on the number of subsets and the number of transmit antennas.

The receiving of the feedback information may include receiving, from the user terminal, an identification number of the user terminal, a signal-to-interference noise ratio (SINR) value selected at the user terminal, beamforming vector index information corresponding to the selected SINR value, and subset index information in the codebook, and the beamforming vectors may be beamforming vectors at positions corresponding to the subset index information in the codebook and the beamforming vector index information.

The selecting of the user terminal may include grouping user terminals having the same beamforming vector index information and subset index information in the codebook based on the received feedback information into a group, and selecting the user terminal for transmitting the transmission signal based on an SINR of each of the user terminals belonging to the group.

The performing of the analog beamforming may include performing analog beamforming of controlling a phase of a complex signal aside from a magnitude of the complex signal based on a phase shifter element.

According to an aspect of at least one example embodiment, there is provided a transmission apparatus for performing hybrid beamforming in a downlink channel with respect to at least one user terminal, the transmission apparats including an information transceiver configured to receive feedback information from each of the at least one user terminal; a scheduler configured to select at least one user terminal for transmitting a transmission signal based on the received feedback information; a scheduler configured to select at least one user terminal for transmitting a transmission signal based on the received feedback information; a digital beamforming performer configured to perform digital beamforming with respect to the selected at least one user terminal; and an analog beamforming performer configured to perform analog beamforming with respect to the selected at least one user terminal based on a prestored codebook. The codebook includes a desired number of subsets calculated based on a number of transmit antennas and a number of radio frequency (RF) chains, and each of the subsets includes a number of beamforming vectors corresponding to the number of RF chains.

The number of RF chains for analog beamforming may be less than or equal to the number of transmit antennas.

Each of the beamforming vectors may have a dimension of the number of transmit antennas×1.

The digital beamforming performer may be configured to perform the digital beamforming based on an identity matrix, in response to the downlink channel being a millimeter wave channel.

The information transceiver may be configured to receive feedback on effective channel information from user terminals selected from the user terminals in response to the downlink channel being a channel in which inter-user interference is present.

The digital beamforming performer may be configured to generate a digital beamforming matrix for cancelling interference between the user terminals based on one of digital linear precoding and non-linear digital precoding using the fed back effective channel information and to perform the digital beamforming based on the generated digital beamforming matrix.

The beamforming vectors may be configured to form a beam pattern at the same interval that is calculated based on the number of subsets and the number of transmit antennas.

The information transceiver may be configured to receive, from the user terminal, an identification number of the user terminal, an SINR value selected at the user terminal, beamforming vector index information corresponding to the selected SINR value, and subset index information in the codebook.

The scheduler may be configured to group user terminals having the same beamforming vector index information and subset index information in the codebook based on the received feedback information into a group, and to select the user terminal for transmitting the transmission signal based on an SINR of each of the user terminals belonging to the group.

The analog beamforming performer may be configured to include phase shift elements for controlling a phase of a complex signal aside from a magnitude of the complex signal.

According to an aspect of at least one example embodiment, there is provided a hybrid beamforming method of a reception apparatus, the method including calculating an SINR value with respect to beamforming vectors included in a prestored codebook based on a millimeter wave channel environment; determining an SINR value associated with a beamforming vector to be used for beamforming at a base station based on the calculated SINR value; transmitting, to the base station, feedback information that includes beamforming vector index information corresponding to the determined SINR value, subset index information in the codebook, the determined SINR value, and an identification number of the reception apparatus; and receiving, from the base station, a transmission signal to which digital beamforming and analog beamforming is performed based on the codebook and the feedback information. The codebook includes a desired number of subsets calculated based on a number of transmit antennas and a number of RF chains, and each of the subsets includes a number of beamforming vectors corresponding to the number of RF chains.

According to an aspect of at least one example embodiment, there is provided a reception apparatus including an SINR calculator configured to calculate an SINR value with respect to beamforming vectors included in a prestored codebook based on a millimeter wave channel environment and to determine an SINR value associated with a beamforming vector to be used for beamforming at a base station based on the calculated SINR value; a feedback transmitter configured to transmit, to the base station, feedback information that includes beamforming vector index information corresponding to the determined SINR value, subset index information in the codebook, the determined SINR value, and an identification number of the reception apparatus; and an information receiver configured to receive, from the base station, a transmission signal to which digital beamforming and analog beamforming is performed based on the codebook and the feedback information. The codebook includes a desired number of subsets calculated based on a number of transmit antennas and a number of RF chains, and each of the subsets includes a number of beamforming vectors corresponding to the number of RF chains.

According to some one example embodiments, a base station may perform beamforming in a millimeter wave channel environment, thereby reducing an amount of power consumed and hardware cost by reducing a number of radio frequency (RF) chains while using a large number of antennas and by performing digital-analog hybrid beamforming.

Also, according to some example embodiments, it is possible to simultaneously support a plurality of users and increase the transmission capacity of the entire cell by performing beamforming with respect to user terminals densely belonging to a small cell in a millimeter wave channel environment.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION OF THE INVENTION

Figure 1:
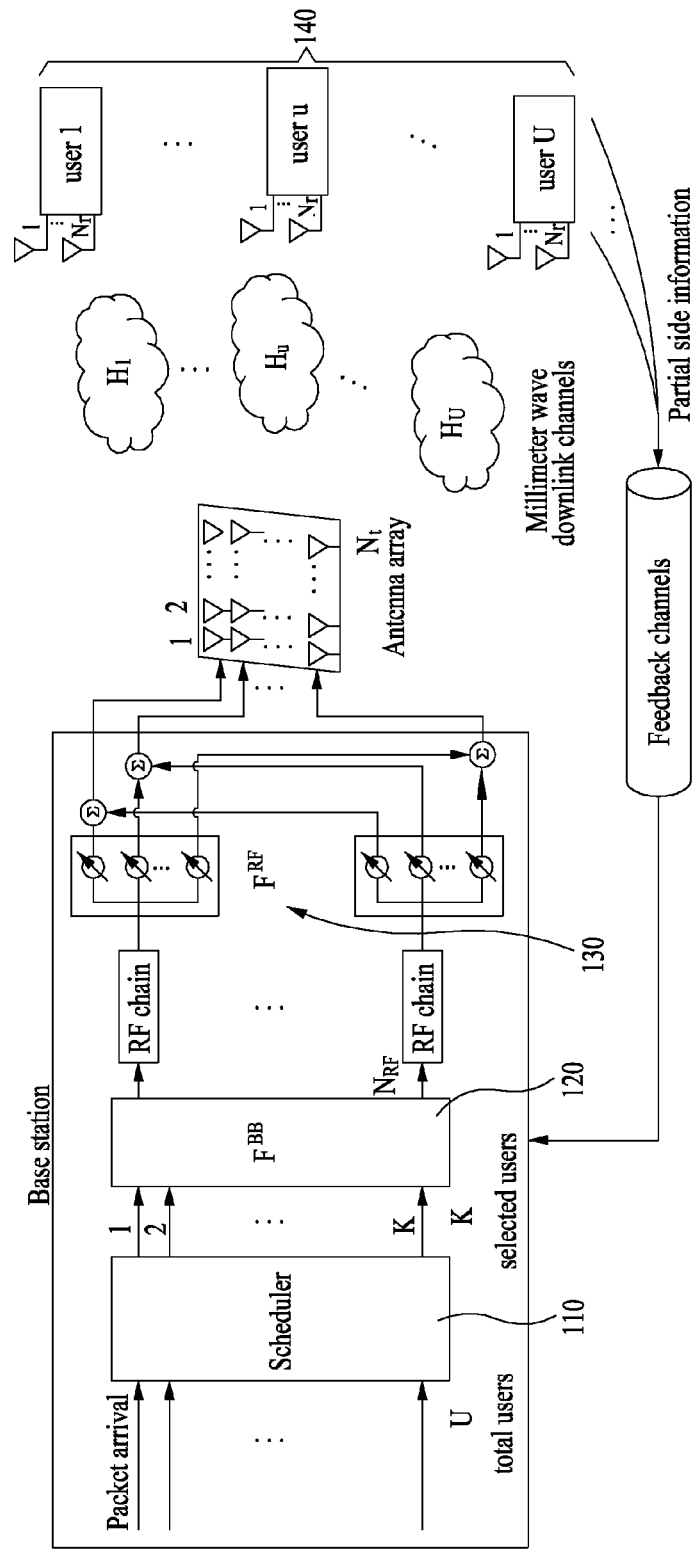
FIG. 1 is a diagram illustrating an example of a system for performing beamforming in a millimeter wave downlink channel according to an example embodiment.

One or more example embodiments will be described with reference to the accompanying drawings. Advantages and features of the example embodiments, and methods for achieving the same may become explicit by referring to the accompanying drawings and the following example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Hereinafter, example embodiments will be described with reference to the accompanying drawings.

The example embodiments relate to technology for performing beamforming with respect to a plurality of user terminals (UEs) belonging to a base station (BS) in a millimeter wave channel environment, and more particularly, to hybrid beamforming technology for performing digital beamforming and analog beamforming to simultaneously support a plurality of user terminals when a number of transmit antennas of a base station is less than a number of radio frequency (RF) chains. Herein, description is made with the assumption that the number of RF chains is less than the number of transmit antennas. However, it is provided as an example only. The number of RF chains may be equal to the number of transmit antennas of the base station. That is, the number of RF chains may be less than or equal to the number of transmit antennas of the base station.

Also, in the example embodiments, a predesigned codebook may be shared between a base station and user terminals belonging to a cell, for example, a femtocell and a microcell, corresponding to the base station, and may be stored and maintained in each apparatus. The base station may perform digital and analog beamforming with respect to the user terminals based on the prestored codebook.

Also, in the example embodiments, hybrid beamforming may represent digital beamforming performed at a baseband end and analog beamforming performed at an RF end. The base station may be represented as a transmission apparatus and the user terminal may be represented as a reception apparatus.

Also, in the example embodiments, description is made based on an example in which the base station performs digital beamforming and analog beamforming based on the codebook. However, the user terminal, that is, the reception apparatus may receive a signal that is beamformed at the base station and transmitted from the base station and may recover a source signal, and may include components corresponding to digital beamforming and analog beamforming to restore the source signal transmitted from the base station.

The terms used herein may follow as:
1. SDMA: describes a space division multiple access.
2. Beam: describes an antenna pattern formed based on a weight vector to be multiplied by an antenna array by a transmission apparatus.
3. Beamforming: may be represented as precoding.
4. Codebook (or beam codebook): describes a matrix that includes beamforming vectors promised in advance between a base station that is a transmission apparatus and user terminals.
5. BS: describes a base station, User (or UE): describes a user (or a user terminal).
6. RF: describes a radio frequency, BB: describes a baseband
7. CSI: describes channel state information.
8. CSI at receiver (CSIR): describes that a reception apparatus (receiver) is aware of channel information.
9. CSI at transmitter (CSIT): describes that a transmission apparatus (transmitter) is aware of channel information.
10. SNR: describes a signal-to-noise ratio.
11. SINR: describes a signal-to-interference plus noise ratio.
12. AWGN: describes additive white Gaussian noise.
13. DFT: describes discrete Fourier transform.
14. MRT: describes maximum ratio transmission that is one of multiple antenna transmission schemes.
15. MRC: describes maximal ratio combining that is one of multiple antenna reception schemes.
16. MIMO: describes multiple input multiple output.

The notations used herein may be arranged as follows:
The terms used for millimeter waves may follow as:
1. $N_t$: describes the number of transmit antennas of a base station that is a transmitter, that is, a transmission apparatus.
2. $N_r$: describes the number of receive antennas of each user terminal that is a receiver, that is, a reception apparatus.
3. U: describes the total number of users.
4. K: describes the number of users selected to transmit a transmission signal through scheduling from among the total of U users.
5. $N_{RF}$: describes the number of RF chains of a base station that is a transmission apparatus.
6. $H_u$: describes a complex channel matrix, $H_u \in \mathbb{C}^{N_r \times N_t}$, between a base station that is a transmission apparatus and $u^{th}$ user terminal.
7. $F^{RF}$: describes an analog beamforming matrix (RF beamforming matrix) $F^{RF} \in \mathbb{C}^{N_t \times N_{RF}}$.
8. $F^{BB}$: describes a digital beamforming matrix (baseband beamforming matrix) $F^{BB} \in \mathbb{C}^{N_{RF} \times K}$.
9. $\mathbb{E}[\cdot]$: describes an expectation operator
10. $I_K$: describes an identity matrix having a size of K×K.
11. $[\cdot]^T/[\cdot]^H$: describes a transpose/conjugate transpose.
12. $\lceil \cdot \rceil$: describes a ceiling operator.

In the case of codebook-based SDMA, CSIR is assumed. That is, it is assumed that each user terminal is aware of its channel matrix through channel estimation. A beam codebook is predesigned and shared between a base station and user terminals. The beam codebook may be predesigned so that all of beamforming vectors included in the beam codebook, that is, the codebook may be orthogonal to each other. Here, each user terminal may feed back its channel information to the base station that is a transmission apparatus through a feedback channel. Here, each user terminal may feed back an index of a desired beam within the beam codebook and an SINR value associated with a beamforming vector corresponding to a beam index to the base station instead of feeding back all of channel vector values. The base station may perform user and beam scheduling based on information that is fed back from all of the user terminals. That is, the base station may select a beam to be allocated to K ($\leq N_{RF}$) user terminals that are selected from among a total of U user terminals. The base station may simultaneously support a plurality of users by multiplying the selected corresponding beam by signals of the selected K user terminals and simultaneously transmitting the signals. The user terminal may perform MRC with respect to an effective channel vector corresponding to the beam that is fed back from the user terminal and may receive a signal transmitted from the base station. Here, since beamforming is performed based on the codebook that is predesigned to be suitable for a millimeter wave channel environment, the user terminal may or may not feed back effective channel information to the base station depending on the channel environment.

FIG. 1 is a diagram illustrating an example of a system for performing beamforming in a millimeter wave downlink channel according to an example embodiment.

Referring to FIG. 1, a base station, that is, a transmission apparatus may include a scheduler 110 configured to perform scheduling of selecting K user terminals from among a total of U user terminals, a digital beamforming matrix $F^{BB}$ (digital beamforming matrix) 120 configured to perform digital beamforming for transmitting a signal to the selected K user terminals, and an RF beamforming matrix $F^{RF}$ (analog beamforming matrix) 130. Here, the base station may use an array antenna in a predetermined (or, alternatively, desired) shape as a transmit antenna. For example, a linear array antenna and a planar array antenna may be used.

The digital beamforming matrix $F^{BB}$ 120 may be used to control all of a magnitude and a phase of a complex signal through digital signal processing and may be used to perform digital beamforming.

The RF beamforming matrix $F^{RF}$ 130 does not control the magnitude of the complex signal and is used to control only the phase of the complex signa. That is, the RF beamforming matrix $F^{RF}$ 130 may be used for analog beamforming. An analog beamformed signal may be transmitted to user terminals 140 through transmit antennas.

Figure 2:
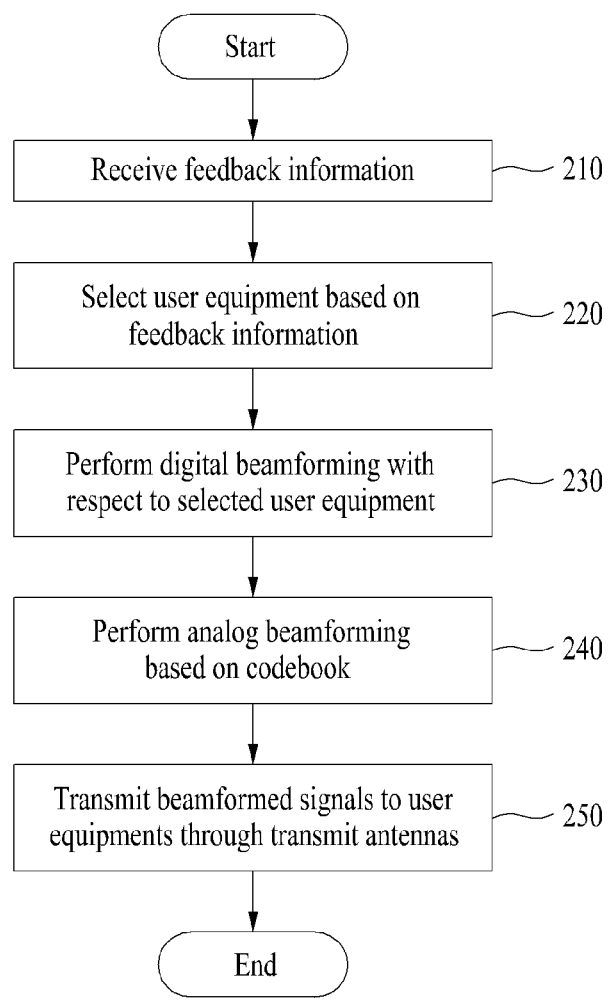
FIG. 2 is a flowchart illustrating an example of a method of performing hybrid beamforming in a millimeter wave downlink channel according to an example embodiment.
Figure 3:
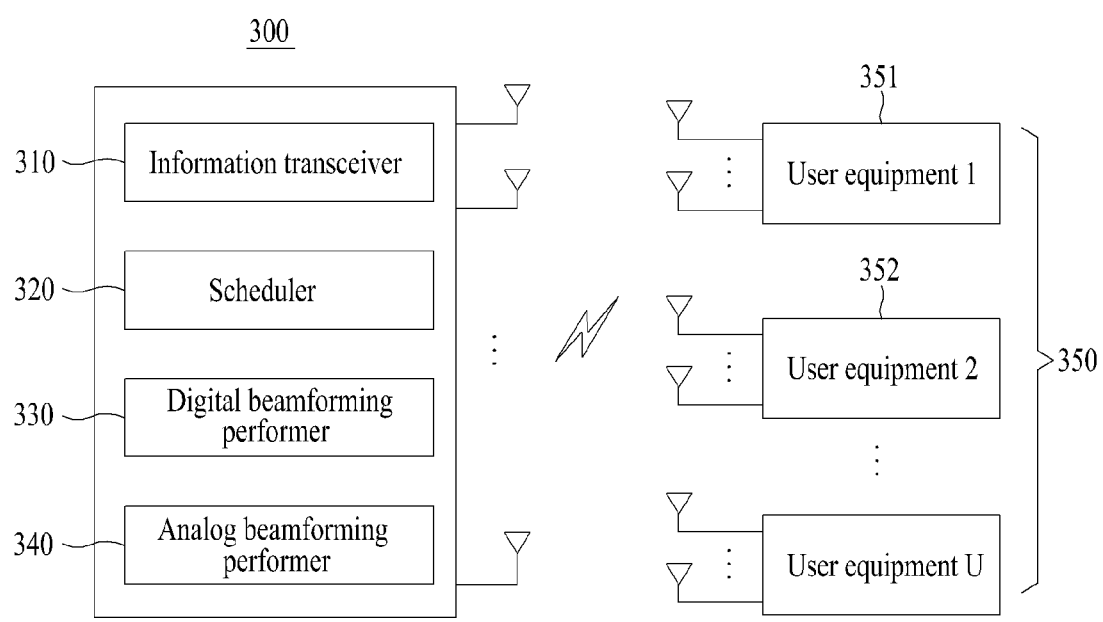
FIG. 3 is a diagram illustrating an example of a transmission apparatus for performing hybrid beamforming according to an example embodiment.

FIG. 2 is a flowchart illustrating an example of a method of performing hybrid beamforming in a millimeter wave downlink channel according to an example embodiment, and FIG. 3 is a diagram illustrating an example of a transmission apparatus for performing hybrid beamforming according to an example embodiment.

Operations 210 through 250 of FIG. 2 may be performed by an information transceiver 310, a scheduler 320, a digital beamforming performer 330, and an analog beamforming performer 340, which are components of a transmission apparatus 300 of FIG. 3.

An example in which the transmission apparatus 300 that is a base station performs hybrid beamforming with respect to user terminals 350 belonging to a specific cell covered by the transmission apparatus 300 will be described with reference to FIGS. 2 and 3.

A codebook suitable for a system model ($N_t \geq N_{RF}$) in which a number of RF chains ($N_{RF}$) is less than a number of transmit antennas ($N_t$) of the transmission apparatus 300 may be shared and stored in advance between the transmission apparatus 300 and the user terminals 350.

In operation 210, the information transceiver 310 may receive feedback information from each of at least one user terminal 350 belonging to the transmission apparatus 300.

Here, the information transceiver 310 may receive, from each user terminal 350, feedback information that includes an identification number of the corresponding user terminal 350 required for beamforming of a transmission signal, an SINR value selected at the user terminal 350, for example, a maximum SINR value, beamforming vector index information corresponding to the selected SINR value, and subset index information in the codebook.

In addition, when a channel environment is a cellular channel environment or a channel environment in which interference between the user terminals 350 (hereinafter, also referred to as inter-user interference) is greater than or equal to reference interference, the feedback information may further include effective channel information. That is, the information transceiver 310 may further receive feedback on the effective channel information based on the channel environment. The information transceiver 310 may receive feedback on the effective channel information from all of the user terminals 350 belonging to the transmission apparatus 300. Alternatively, the information transceiver 310 may receive feedback on the effective channel information from a portion, for example, a user terminal 1 351 and a user terminal 2 352, selected from among the user terminals 350.

In operation 220, the scheduler 320 may perform scheduling of selecting at least one user terminal for transmitting a transmission signal based on the received feedback information.

In operation 230, the digital beamforming performer 330 may perform digital beamforming with respect to the selected at least one user terminal.

For example, K user terminals may be selected and the digital beamforming performer 330 may perform digital beamforming by multiplying K transmission signals by a digital beamforming matrix $F^{BB}$. Here, when the channel environment corresponds to a millimeter wave channel, the inter-user interference may be small since not many multi-path components are present. Accordingly, the digital beamforming matrix $F^{BB}$ may be configured as an identity matrix $I_K$.

That is, in the channel environment in which the inter-user interference is small, there is no need to receive feedback on effective channel information for each user terminal and the digital beamforming matrix is configured as the identity matrix and accordingly, separate digital beamforming is not performed to cancel the inter-user interference. As described above, since the effective channel information is not received from the user terminals 350, system overhead may decrease.

In operation 240, the analog beamforming performer 340 may perform analog beamforming with respect to the selected at least one user terminal, for example, the K user terminals, based on the prestored codebook. Here, the analog beamforming performer 340 may include phase shifter elements and may perform analog beamforming of controlling a phase of a complex signal aside from a magnitude of the complex signal.

In operation 250, beamformed signals may be transmitted to the user terminals 350 through transmit antennas.

Here, the codebook may include a desired number of subsets, for example, M subsets, which are calculated based on the number of transmit antennas ($N_t$) included in the transmission apparatus 300 and the number of RF chains ($N_{RF}$). Here, $$M = \left\lceil \frac{N_t}{N_{RF}} \right\rceil.$$

Each of the subsets included in the codebook may include a number of beamforming vectors corresponding to the number of RF chains and each beamforming vector may have a dimension of $N_t \times 1$.

A received signal of a $k^{th}$ user terminal among the K user terminals selected through scheduling may be represented by the following Equation 1.

$$y_k = \sqrt{\rho} H_k F^{RF} F^{BB} s + n_k \quad \text{[Equation 1]}$$

In Equation 1, $y_k \in \mathbb{C}^{N_r \times 1}$ denotes a received signal vector and $\rho$ denotes transmission power. Since power normalization of a random channel matrix is represented by $\mathbb{E}[\|H_k\|^2] = N_t N_r$, $\|F^{RF} F^{BB}\|^2 = K$ may represent the power normalization of beamforming matrices. Here, $s = [s_1, s_2, \ldots, s_K]^T$, which may represent a transmission stream vector including K symbols.

$$\mathbb{E}[ss^H] = \frac{1}{K} I_K$$

denotes power normalization of a transmission symbol and $n_k \sim \mathcal{CN}(0, \sigma_n^2 I)$ denotes an additive noise vector. Each element of a vector may represent a random variable according to a complex Gaussian distribution. Also, SNR $\triangleq \rho/\sigma_n^2$ denotes a signal-to-noise ratio.

In FIGS. 2 and 3, a millimeter wave channel in which inter-user interference is small may be used for a channel environment between the transmission apparatus 300 and the user terminals 350. A millimeter wave channel in a $u^{th}$ user terminal among a total of U user terminals may be represented by the following Equation 2.

$$H_u = \sqrt{\frac{N_t}{N_p}} \sum_{p=1}^{N_p} h_{u,p} a_r(\theta^r_{u,p}, \phi^r_{u,p}) a_t(\theta^t_{u,p}, \phi^t_{u,p})^H \quad \text{[Equation 2]}$$

In Equation 2, $h_{u,p} \sim \mathcal{CN}(0,1)$ denotes a random path gain, that is, a complex gaussian random variable, $N_p$ denotes a number of multipaths present in a channel, and $\theta_{u,p}^t/\phi_{u,p}^t$ denotes an elevation angle/azimuth angle of each channel path using the transmit antenna $N_t$. Also, $\alpha_t(\cdot)$ denotes a normalized array steering vector of a transmit array antenna, for example, a vector that constitutes an analog beamforming matrix of performing analog beamforming for changing only a phase of a signal aside of a magnitude of the signal. $\alpha_r(\cdot)$ denotes a normalized array response vector of a receive array antenna.

Here, $\alpha_t(\cdot)/\alpha_r(\cdot)$ relates to a random array antenna, and may be represented by the following Equation 4 in the case of, for example, a linear array antenna and may be represented by the following Equation 5 in the case of a planar array antenna, for example, a planar array antenna in a rectangular shape. For equational simplification, $v_{u,p}^t$, $w_{u,p}^t$, $v_{u,p}^r$, $w_{u,p}^r$ may be defined as shown in the following Equation 3.

$$v_{u,p}^t \triangleq \cos\theta_{u,p}^t, \quad w_{u,p}^t \triangleq \sin\theta_{u,p}^t \sin\phi_{u,p}^t \quad \text{[Equation 3]}$$
$$v_{u,p}^r \triangleq \cos\theta_{u,p}^r, \quad w_{u,p}^r \triangleq \sin\theta_{u,p}^r \sin\phi_{u,p}^r$$

$$a_t(v_{u,p}^t) = \frac{1}{\sqrt{N_t}}\left[1, e^{-j\frac{2\pi}{\lambda}d v_{u,p}^t}, \ldots, e^{-j\frac{2\pi}{\lambda}d(N_t-1)v_{u,p}^t}\right]^T \quad \text{[Equation 4]}$$

$$a_r(v_{u,p}^r) = \frac{1}{\sqrt{N_r}}\left[1, e^{-j\frac{2\pi}{\lambda}d v_{u,p}^r}, \ldots, e^{-j\frac{2\pi}{\lambda}d(N_r-1)v_{u,p}^r}\right]^T$$

$$a_t(w_{u,p}^t, v_{u,p}^t) = \frac{1}{\sqrt{N_t}}\left[1, e^{-j\frac{2\pi}{\lambda}d(m w_{u,p}^t + n v_{u,p}^t)}, \ldots, \quad \text{[Equation 5]}\right.$$
$$\left. e^{-j\frac{2\pi}{\lambda}d((W_t-1)w_{u,p}^t + (H_t-1)v_{u,p}^t)}\right]^T,$$

Here, $m \in \{0, \ldots, W_t-1\}$,
$n \in \{0, \ldots, H_t-1\}$, $N_t = W_t H_t$.

$$a_r(w_{u,p}^r, v_{u,p}^r) = \frac{1}{\sqrt{N_r}}\left[1, e^{-j\frac{2\pi}{\lambda}d(m w_{u,p}^r + n v_{u,p}^r)}, \ldots, \right.$$
$$\left. e^{-j\frac{2\pi}{\lambda}d((W_r-1)w_{u,p}^r + (H_r-1)v_{u,p}^r)}\right]^T,$$

Here, $m \in \{0, \ldots, W_r-1\}$,
$n \in \{0, \ldots, H_r-1\}$, $N_r = W_r H_r$.

In Equation 4 and Equation 5, $\lambda$ denotes a wavelength and d denotes an interval, that is, a distance between a transmit antenna and a receive antenna.

Hereinafter, an operation of designing a beam codebook, that is, a codebook, suitable for a millimeter wave channel environment that is prestored between the transmission apparatus 300 and the user terminals 350 will be described. In particular, the codebook is designed to guarantee a sum rate in a system environment in which the number of RF chains is less than the number of transmit antennas and to reduce hardware cost, and may be represented as a DFT-MRT beam codebook.

The codebook may include orthogonal beamforming vectors to minimize interference when the transmission apparatus 300 simultaneously transmits a plurality of beams, and may be represented as a set C including $N_t$ elements. That is, the codebook C may have a DFT matrix characteristic.

Here, the codebook C may be matched to a channel vector by considering an array antenna structure and may acquire a maximum beamforming gain. That is, the codebook C may be designed to be an MRT beam shape. Herein, the codebook, represented as the set C that satisfies both characteristics, the DFT matrix and MRT, may also be referred to as the DFT-MRT beam codebook.

For example, when transmit antennas of the transmission apparatus 300, that is, the base station are linear array antennas, the codebook C may be represented by the following Equation 6.

$$C = \left\{a_t(v) \,\middle|\, v \in \left\{-1 + \frac{2}{N_t}, -1 + \frac{4}{N_t}, \ldots, 1\right\}\right\} \quad \text{[Equation 6]}$$
for even $N_t$ $$C = \left\{a_t(v) \,\middle|\, v \in \left\{-\frac{N_t-1}{N_t}, -\frac{N_t-3}{N_t}, \ldots, \frac{N_t-1}{N_t}\right\}\right\}$$
for odd $N_t$ When the transmit antennas are planar array antennas, for example, $W_t \times H_t$ antennas where $W_t$ denotes a number of horizontal antennas and $H_t$ denotes a number of vertical antennas, the codebook C may be represented by the following Equation 7.

$$C = \left\{a_t(w,v) \,\middle|\, w \in \left\{-1+\frac{2}{W_t}, -1+\frac{4}{W_t}, \ldots, 1\right\}, v \in \left\{-1+\frac{2}{H_t}, -1-\frac{4}{H_t}, \ldots, 1\right\}\right\} \text{ for even } W_t, H_t \quad \text{[Equation 7]}$$

$$C = \left\{a_t(w,v) \,\middle|\, w \in \left\{-\frac{W_t-1}{W_t}, -\frac{W_t-3}{W_t}, \ldots, \frac{W_t-1}{W_t}\right\}, v \in \left\{-\frac{H_t-1}{H_t}, -\frac{H_t-3}{H_t}, \ldots, \frac{H_t-1}{H_t}\right\}\right\} \text{ for odd } W_t, H_t$$

$$C = \left\{a_t(w,v) \,\middle|\, w \in \left\{-1+\frac{2}{W_t}, -1+\frac{4}{W_t}, \ldots, 1\right\}, v \in \left\{-\frac{H_t-1}{H_t}, -\frac{H_t-3}{H_t}, \ldots, \frac{H_t-1}{H_t}\right\}\right\} \text{ for even } W_t \text{ and odd } H_t$$

$$C = \left\{a_t(w,v) \,\middle|\, w \in \left\{-\frac{W_t-1}{W_t}, -\frac{W_t-3}{W_t}, \ldots, \frac{W_t-1}{W_t}\right\}, v \in \left\{-1+\frac{2}{H_t}, -1+\frac{4}{H_t}, \ldots, 1\right\}\right\} \text{ for odd } W_t \text{ and even } H_t$$

In Equation 6, when the transmit antennas are the linear array antennas, subsets included in the designed codebook C may be acquired by dividing the whole set C by M subsets $v^{(1)}, \ldots, v^{(M)}$ where $$M = \left\lceil \frac{N_t}{N_{RF}} \right\rceil.$$

Each of the M subsets may include a number of beamforming vectors corresponding to the number of RF chains ($N_{RF}$) that satisfies the following Equation 8. That is, the codebook C may include the M subsets and each of the M subsets may include $N_{RF}$ beamforming vectors.

$$v^{(m)} = \{\alpha_t(v^{(m,1)}), \ldots, \alpha_t(v^{(m,n)}), \ldots, \alpha_t(v^{(m,N_{RF})})\}$$
$$\subseteq \tilde{C}$$

$$\tilde{C} = U_{m=1}^M V^{(m)} \qquad \text{[Equation 8]}$$

Here, each of $N_{RF}$ beamforming vectors $V^{(m)}$ that constitute each subset may have a dimension of $N_t \times 1$. For example, if $N_t=8$ and $N_{RF}=2$, the number of subsets is M=8/2=4, the codebook C includes four subsets, and each of the four subsets includes beamforming vectors with a dimension of 8×1. For example, a first subset $V^1$ may include beamforming vectors $V^{1,1}$ and $V^{1,2}$ with a dimension of 8×1.

Beamforming vectors of each subset may be disposed at the same interval to satisfy the following Equation 9. That is, the beamforming vectors may form a beam pattern at the same interval as shown in FIG. 4.

$$v^{(m,n+1)} - v^{(m,n)} = \frac{2M}{N_t} \; \forall m \in \{1, \ldots, M\}, \qquad \text{[Equation 9]}$$
$$\forall n \in \{1, \ldots, N_{RF}\}.$$

Figure 4:
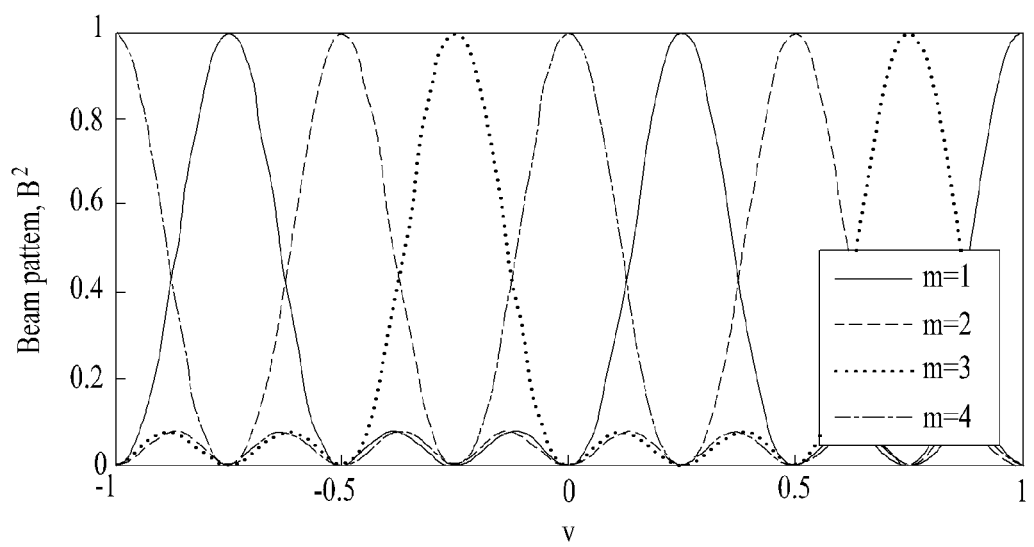
FIG. 4 illustrates an example of a beam pattern formed based on a codebook of a linear array antenna if $N_t=8$ and $N_{RF}=2$ according to an example embodiment.
Figure 9:
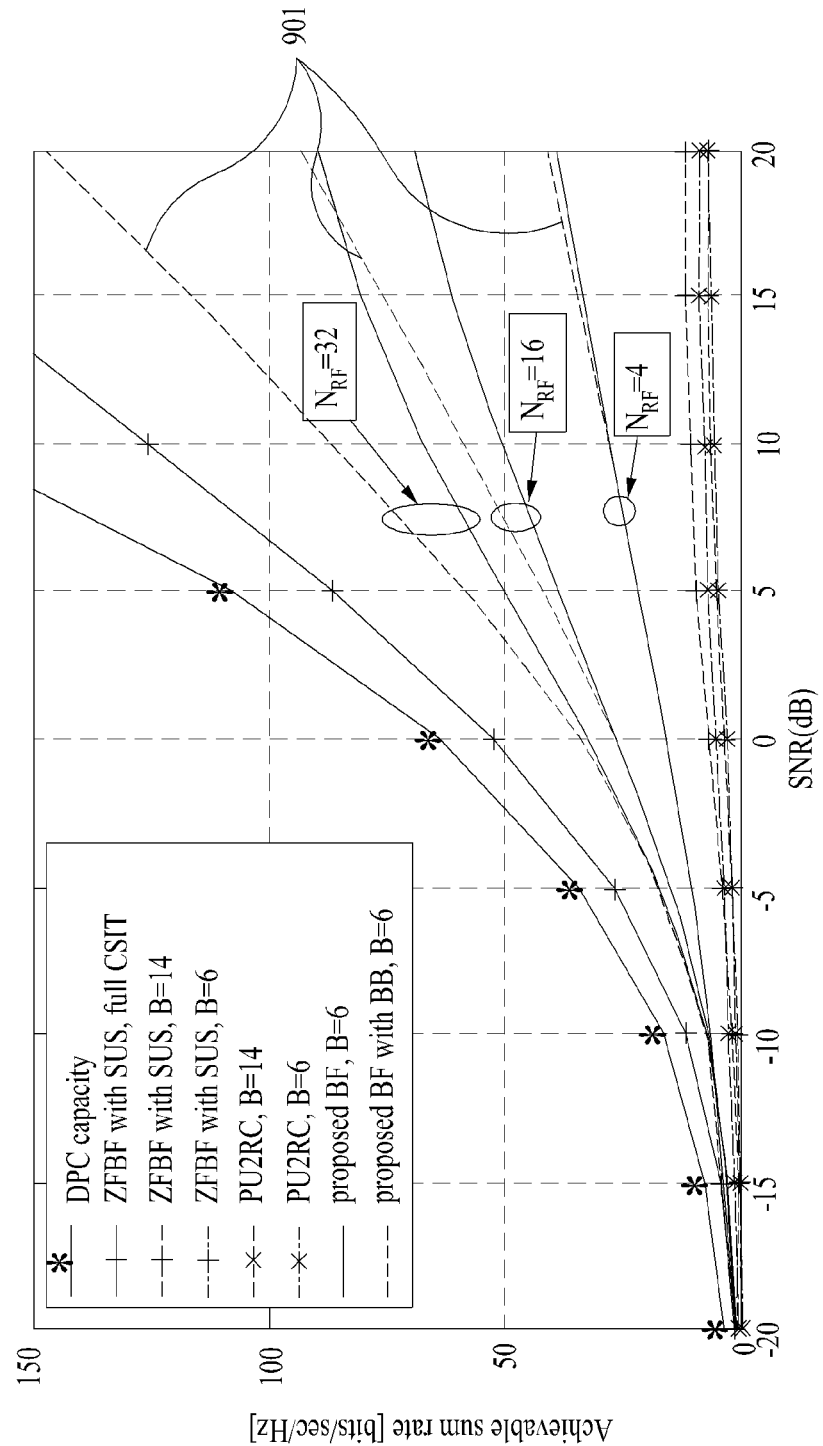
FIG. 9 illustrates an example of a graph showing a sum rate with respect a signal-to-noise ratio (SNR) according to an example embodiment.

Referring to FIG. 9 and FIG. 4, four subsets $V^{(1)}$, $V^{(2)}$, $V^{(3)}$, and $V^{(4)}$ may be designed as the following Equation 10.

$$V^{(1)} = \{\alpha_t(-\tfrac{3}{4}), \alpha_t(\tfrac{1}{4})\}, V^{(2)} = \{\alpha_t(-\tfrac{2}{4}), \alpha_t(\tfrac{2}{4})\},$$
$$V^{(3)} = \{\alpha_t(-\tfrac{1}{4}), \alpha_t(\tfrac{3}{4})\}, V^{(4)} = \{\alpha_t(0), \alpha_t(1)\} \qquad \text{[Equation 10]}$$

Figure 5:
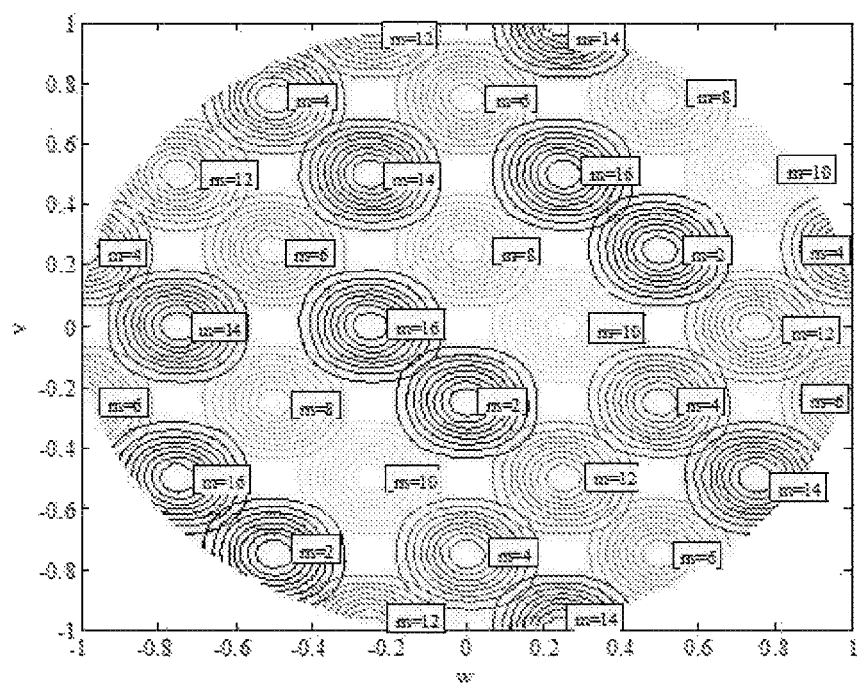
FIG. 5 illustrates an example of a beam pattern formed based on a codebook of a planar array antenna plotted only with respect to an odd number m if $N_t=8\times8=64$, $N_{RF}=4$, and $M=16$ according to an example embodiment.

When a transmit antenna is in a planar array antenna structure, a beam of a planar array antenna may be represented by multiplying a beam formed using two independent linear array antennas. That is, a beam pattern of FIG. 5 may be formed by generating and combining a subset of a codebook with respect to each of w and v domains.

The base station, that is, the transmission apparatus may perform user and beam scheduling based on the codebook C including the M subsets, that is $v^{(1)}, \ldots, v^{(M)}$, according to Equation 8.

Here, to perform user scheduling of selecting K user terminals from among a total of U user terminals, each subset $V_{(m)}$ constituting the codebook as a candidate to be used as an analog beamforming matrix (RF beamforming matrix) $F^{RP} = [f_1, \ldots, f_n, \ldots, f_{N_{RF}}]$ may be represented again as the following Equation 11. Here, K may be less than or equal to U.

$$V^{(m)} = \{f^{(m,1)}, \ldots, f^{(m,n)}, \ldots, f^{m,N_{RF}}\}, \forall m \in \{1, \ldots, M\} \qquad \text{[Equation 11]}$$

The $u^{th}$ user terminal may calculate an SINR value with respect to all of the beamforming vectors based on channel information of the $u^{th}$ user terminal and the codebook. That is, the $u^{th}$ user terminal may calculate the SINR value with respect to each of all the beamforming vectors included in the codebook. For example, the SINR value may be calculated according to the following Equation 12.

$$SINR_{u,m,n} = \qquad \text{[Equation 12]}$$
$$\frac{|w_{u,m,n}^H H_u f^{(m,n)}|^2}{\frac{N_{RF}}{SNR} + \sum_{i \neq n}^{N_{RF}} |w_{u,m,n}^H H_u f^{(m,i)}|^2} \; \forall u \in \{1, \ldots, U\},$$
$$\forall m \in \{1, \ldots, M\}, \forall n \in \{1, \ldots, N_{RF}\}$$

In Equation 12, $w_{u,m,n}^H$ denotes a receive beamforming vector, that is, a weight, to be multiplied with a receive array antenna in each user terminal. The $u^{th}$ user terminal may perform maximum ratio combining (MRC) to fit an effective channel in order to maximize an SINR of a received signal. A maximum SINR value may be selected from among SINR values of received signals calculated through MRC and the $u^{th}$ user terminal may transmit, to the transmission apparatus, that is, the base station, an identification number of the $u^{th}$ user terminal, the maximum SINR value, beamforming vector index information corresponding to the maximum SINR value, and codebook subset information corresponding to the maximum SINR value. For example, four pieces of information represented by the following Equation 13 may be fed back to the base station.

$$u, SINR_u = \max_{m,n} SINR_{u,m,n}, (m_u, n_u) = \arg \max_{m,n} SINR_{u,m,n} \qquad \text{[Equation 13]}$$

In Equation 13, u denotes the identification number of the $u^{th}$ user terminal, $SINR_u$ denotes the maximum SINR value of the $u^{th}$ user terminal, $m_u$ denotes the codebook subset index information, that is, index information indicating a $u^{th}$ subset among the subsets included in the codebook, and $n_u$ denotes the beamforming vector index information, that is, index information indicating a $u^{th}$ beamforming vector in the $u^{th}$ subset among the subsets included in the codebook.

An amount of information that is fed back to the base station for each user terminal may be represented by the following Equation 14.

$$B_f = [\log_2 U] + Q + [\log_2 M] + [\log_2 N_{RF}] \text{ bits} \qquad \text{[Equation 14]}$$

In Equation 14, Q denotes a number of bits used for digital quantization in response to feeding back an SINR value.

The base station, that is, the transmission apparatus may perform scheduling of selecting a desired number of user terminals, for example, K user terminal, based on feedback information received from a total of user terminals, for example, U user terminals. For example, the user and beam selection beamforming may be performed based on the following Table 1.

TABLE 1

Joint scheduling and beamforming algorithm

Require: $SINR_u$, $m_u$, $n_u$, $\forall u \in \{1 \leq u \leq U\}$
1. Group user terminals based on fed back index
    $\mathcal{J}_n^{(m)} = \{1 \leq u \leq U | m_u = m \text{ and } n_u = n\}, \forall u$
2. Select user terminal having maximum SINR from each group $$i_n^{(m)} = \arg\max_{u \in \mathcal{J}_n^{(m)}} SINR_u \text{ and } \xi_n^{(m)} = \max_{u \in \mathcal{J}_n^{(m)}} SINR_u$$

TABLE 1-continued

Joint scheduling and beamforming algorithm

3. Select subset to maximize sum rate $$m^* = \underset{m \in \{1,\ldots,M\}}{\operatorname{argmax}} \sum_{n=1}^{N_{RF}} \log_2(1 + \xi_n^{(m)})$$

4. Select user terminals corresponding to selected subset $$\mathcal{S} = \{i_n^{(m^*)} \mid 1 \le n \le N_{RF}, \text{ where } \mathcal{J}_n^{(m^*)} \text{ is not empty.}\}$$

$K = |\mathcal{S}|$ : # of selected users

5. Configure beamforming matrices and stream vector
$F^{BB} = I_K$, $F^{RF} = [\ldots, f^{(m^*, n_i)}, \ldots]$, and
$s = [\ldots, s_{n_i}, \ldots]^T$,
where $n_i \in \mathcal{S}$ and $i = 1, \ldots, K$.

Referring to Table 1, since a relatively small number of multipath components is present in a millimeter wave channel, inter-user interference may be small. Accordingly, additional digital beamforming (baseband beamforming) $F^{BB}$ to for cancel the inter-user interference may not be performed. That is, $F^{BB}=I_K$ and a transmission signal may be transmitted to each of the user terminals by performing beamforming without receiving additional feedback on effective channel information for each user terminal. Although digital beamforming for cancelling the inter-user interference is not performed separately, the aforementioned degradation in the performance by the inter-user interference occurring in each user terminal due to the characteristics of the millimeter wave channel may be insignificant. Accordingly, system overhead resulting from feeding back effective channel information to the base statin may significantly decrease and waste of resources according to feedback of the effective channel information may be prevented.

An operation of performing hybrid beamforming, that is, digital-analog beamforming based on the DFT-MRT beam codebook proposed in the millimeter wave channel environment is described above. However, it is provided as an example only. In addition to the millimeter wave channel environment, the DFT-MRT beam codebook may be used in the channel environment in which the inter-user interference is present, such as a cellular channel and the like.

In the case of a channel environment in which the inter-user interference is present, a digital beamforming matrix $F^{BB}$ may be designed to cancel the inter-user interference and the base station may perform digital beamforming with respect to K user terminals based on the designed digital beamforming matrix $F^{BB}$ and may perform analog beamforming with respect to interference-cancelled signals and may transmit the beamformed signals through transmit antennas.

For example, in the case of a cellular band in which many multipath components are present, the base station may transmit a paging signal for acquiring effective channel information only to the desired number of user terminals from among the total of user terminals belonging to the base station. In response to the paging signal received from the base station, each of the selected user terminals may additionally feed back effective channel information to the base station. For example, a maximum of $N_{RF}^3$ complex numbers including all the selected user terminals may be fed back to the base station and $k^{th}$ effective channel information may be represented by the following Equation 15.

$$H_{eff,k} = w_k^H H_k F^{RF}$$ [Equation 15]

In Equation 15, $w_k$ denotes a receive beamforming vector, that is, a weight to be multiplied with a received signal, to be used at the selected $k^{th}$ user terminal, and $F^{RF}$ denotes a beamforming vector, that is, an RF beamforming matrix including a desired codebook subset, included in subsets of the codebook initially fed back from the selected user terminals to the base station.

In this example, the base station, that is, the transmission apparatus may generate the digital beamforming matrix (baseband beamforming matrix) $F^{BB}$ based on zero-forcing precoding. Here, the digital beamforming matrix $F^{BB}$ may be used to cancel the inter-user interference based on effective channel information received from the selected user terminals. Here, to generate the digital beamforming matrix $F^{BB}$ for cancelling the inter-user interference, digital linear precoding such as a minimum mean square error (MMSE) may be used and on-linear precoding may also be used in addition to the zero-forcing precoding. The non-linear precoding may use dirty paper coding (DPC), Tomlinson-Harashima precoding, and the like.

For example, the digital beamforming matrix $F^{BB}$ may be generated according to the following Equation 16.

$$F^{BB} = \beta H_{eff}^H (H_{eff} H_{eff}^H)^{-1}$$ [Equation 16]

In Equation 16, $\beta$ denotes a normalization factor that satisfies $\|F^{RF} F^{BB}\|^2 = K$. The entire effective channel matrix $H_{eff}$ may be represented by the following Equation 17.

$$H_{eff} = \begin{bmatrix} H_{eff,1} \\ \vdots \\ H_{eff,K} \end{bmatrix}$$ [Equation 17]

Hereinafter, the analysis of performance resulting from performing beamforming based on the DFT-MRT codebook and simultaneously transmitting signals to a plurality of user terminals will be described with reference to FIGS. 6 to 14.

As the number of user terminals continuously increases in a dense urban environment, an asymptotic sum rate of SDMA technology may increase according to a scaling law as represented by the following Equation 18. Here, R may be defined by $$\mathcal{R} = \mathbb{E}\left[\max_{1 \le m \le M} \sum_{n=1}^{N_{RF}} \log_2\left(1 + \max_{u \in \mathcal{J}_n^{(m)}} SINR_{u,m,n}\right)\right].$$

$$\lim_{U \to \infty} \frac{\mathcal{R}}{N_{RF} \log \log U} = 1$$ [Equation 18]

That is, a multiplexing gain of $N_{RF}$ may be acquired and a multi-user diversity gain of log U may also be acquired as the total number of user terminals increases.

Here, the average symbol error rate (SER) according to an environment in which a small number of user terminals are present and an environment in which a large number of user terminals are present may be differently represented. When the number of user terminals is small, the average SER may be represented by the following Equation 19, which is SER bound if $N_{RF}=1$. The following Equation 19 may represent the average SER when M-QAM is used as a modulation scheme.

$$P_e^{(lo)} \leq P_e \leq P_e^{(up)} \quad \text{[Equation 19]}$$

$$P_e^{(lo)} = \sum_{k=1}^{U} \binom{U}{k}(-1)^{k-1}$$

$$\left\{ q\left(\frac{1-\lambda_k^{(lo)}}{2}\right) - \frac{q^2}{16}\left[1 - \frac{4\lambda_k^{(lo)}}{\pi} \times \arctan\left(\frac{1}{\lambda_k^{(lo)}}\right)\right]\right\}$$

$$P_e^{(up)} = \sum_{k=1}^{U} \binom{U}{k}(-1)^{k-s}$$

$$\left\{ q\left(\frac{1-\lambda_k^{(up)}}{2}\right) - \frac{q^2}{16}\left[1 - \frac{4\lambda_k^{(lo)}}{\pi} \times \arctan\left(\frac{1}{\lambda_k^{(up)}}\right)\right]\right\}$$

$$\text{Where } q = 4\left(1 - \frac{1}{\sqrt{M}}\right), p = \frac{2(M-1)}{3\log_2 M},$$

$$\lambda_k^{(lo)} = \sqrt{\frac{N_t SNR}{kp\log_2 M + N_t SNR}},$$

$$\lambda_k^{(up)} = \sqrt{\frac{4N_t SNR}{kpn^2\log_2 M + 4N_t SNR}}$$

A diversity order d of the average SER of Equation 19 may be defined as the following Equation 20.

$$\lim_{SNR \to \infty} \frac{\log P_e(SNR)}{\log SNR} \leq -d \quad \text{[Equation 20]}$$

The diversity order D of Equation 20 denotes an index that represents a gradient in a performance graph of the average SER with respect to an SNR.

Further, if $N_{RF}=1$, $N_p=1$, $U \geq 1$, the diversity order of the average SER may be calculated as U and may be represented by the following Equation 21.

$$\lim_{SNR \to \infty} \frac{\log P_e(SNR)}{\log SNR} = -U \quad \text{[Equation 21]}$$

In Equation 21, $P_e(SNR)$ may be represented by a function of an SNR as the average SER.

The average SER in the case of the environment in which the small number of user terminals are present, for example, if $N_{RF}=1$, is described with reference to Equation 18 to Equation 21. The average SER in the case of the environment in which the large number of user terminals are present, for example, an environment in which a plurality of $N_{RF}$ is used may be represented by the following Equation 22.

$$P_e \approx \frac{q}{12} e^{-\frac{N_t}{pN_{RF}} SNR \ln U} \Gamma\left(\frac{N_t}{pN_{RF}} SNR + 1\right) + \quad \text{[Equation 22]}$$

$$\left(\frac{q}{6} - \frac{q^2}{144}\right) e^{-\frac{4N_t}{3pN_{RF}} SNR \ln U} \Gamma\left(\frac{4N_t}{3pN_{RF}} SNR + 1\right) -$$

$$\frac{q^2}{576} e^{-\frac{2N_t}{pN_{RF}} SNR \ln U} \Gamma\left(\frac{2N_t}{pN_{RF}} SNR + 1\right) -$$

$$\frac{q^2}{144} e^{-\frac{7N_t}{3pN_{RF}} SNR \ln U} \Gamma\left(\frac{7N_t}{3pN_{RF}} SNR + 1\right).$$

Here, $\overline{U} = \frac{U}{N_t}$.

If $N_{RF} \geq 1$, $N_p=1$ and if a large number of users are present, the average SER may be theoretically represented by an approximation equation of Equation 22.

Figure 6:
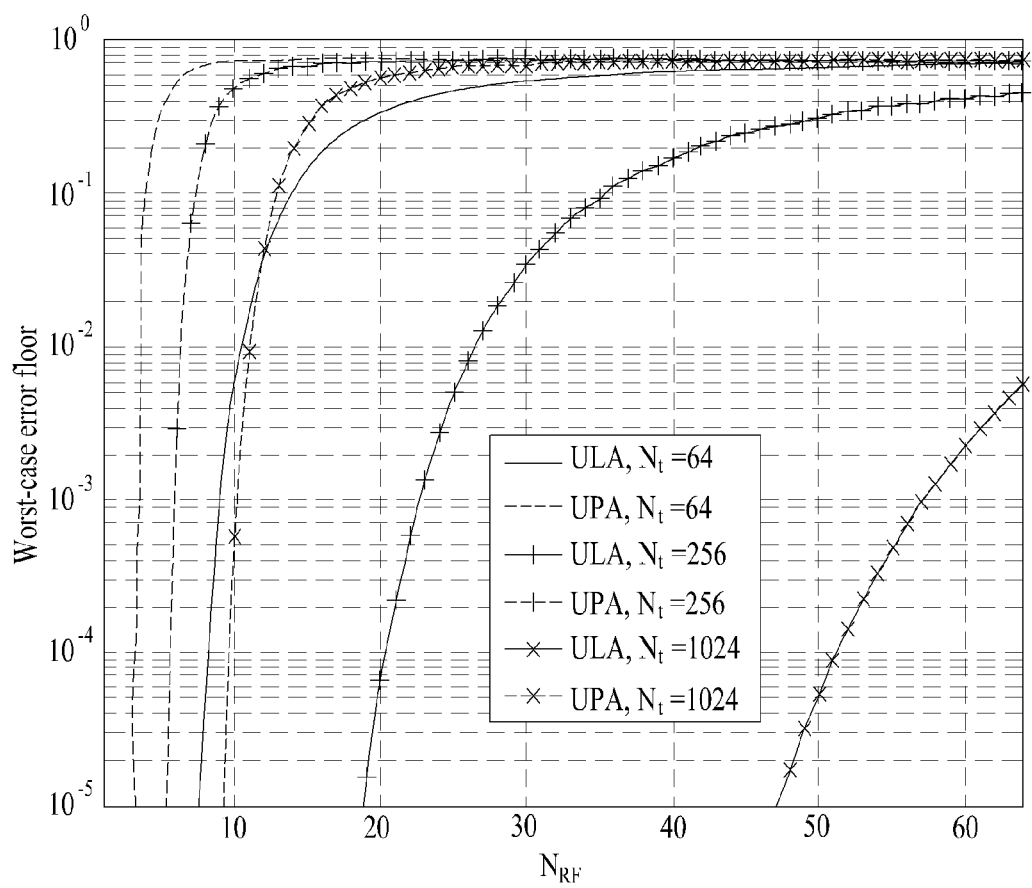
FIG. 6 illustrates an example of a graph showing an error floor of an average symbol error rate (SER) with respect to $N_{RF}$ according to an example embodiment.

FIG. 6 illustrates an example of a graph showing an error floor of the average symbol error rate (SER) with respect to $N_{RF}$ according to an example embodiment.

Referring to FIG. 6, in the case of using linear array antennas, a lowest SINR value may be represented by the following Equation 23. In the case of using planar array antennas, a lowest SINR value may be represented by the following Equation 24.

$$SINR_k \geq \frac{(2N_t - N_{RF})^2}{4(N_{RF}-1)N_{RF}^2} \quad \text{[Equation 23]}$$

$$SINR_k \geq \frac{(2W_t - N_{RF})^2(2H_t - N_{RF})^2}{16(N_{RF}-1)N_{RF}^4} \quad \text{[Equation 24]}$$

An error floor of the average SER having a high SER may be calculated according to Equation 23 and 24. The calculated error floor may be represented as the graph of FIG. 6.

Figure 7:
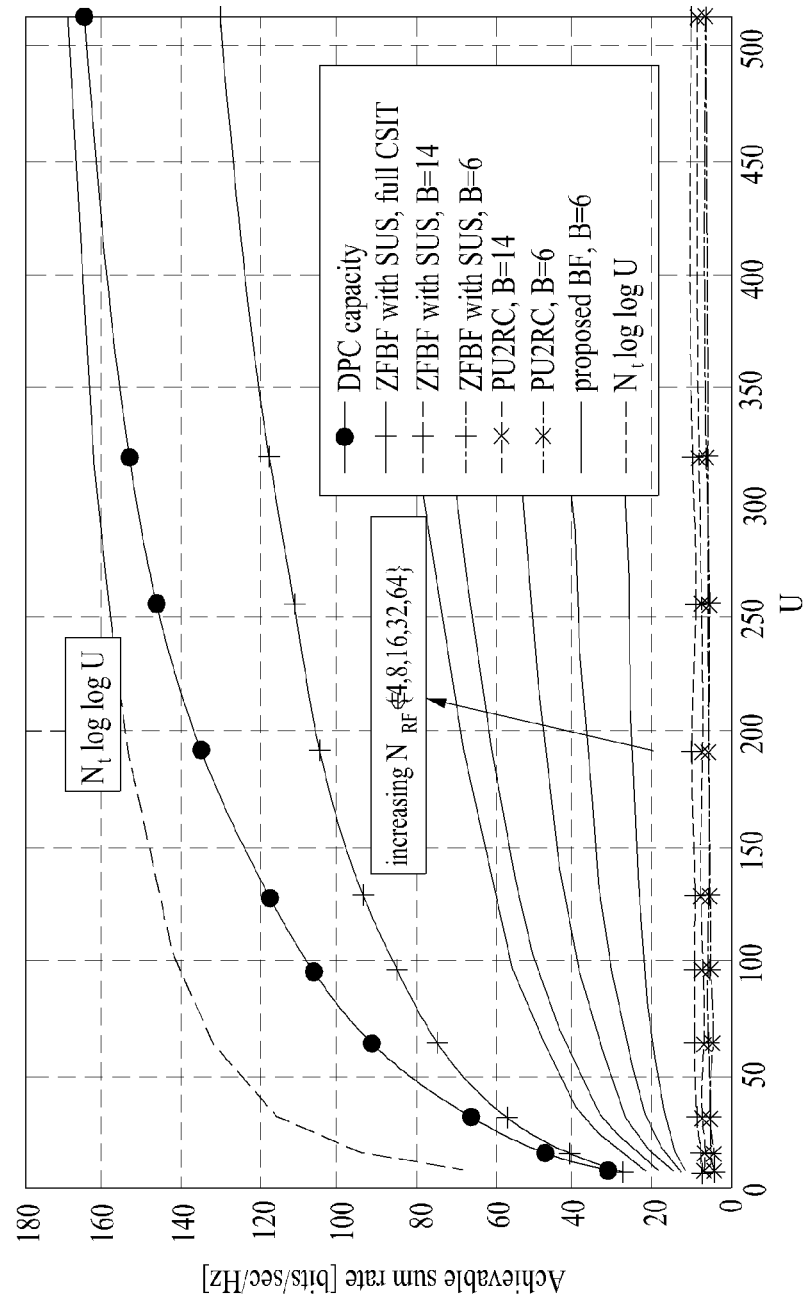
FIG. 7 illustrates an example of a graph showing a sum rate with respect to a number of user terminals according to an example embodiment.

FIG. 7 illustrates an example of a graph showing a sum rate with respect to a number of user terminals according to an example embodiment.

Referring to FIG. 7, a simulation was performed with the assumption that a base station uses planar array antennas in a square shape, a user terminal uses a single antenna, and a channel environment uses a millimeter wave channel.

Further, to compare the performance of a sum rate with a case of performing beamforming based on a DFT-MRT codebook, a dirty paper coding (DPC) scheme, a zero-forcing beamforming (ZFBF) with semi-orthogonal user selection (SUS) scheme, and a per user unitary rate control (PU2RC) scheme were used.

Although the DPC scheme is an optimal precoding method for achieving the theoretical capacity in a multi-user MIMO communication system, channel information of all of the user terminals needs to be known and the complexity of an algorithm is relatively high. Accordingly, it is difficult to implement the DPD scheme in reality. The DPC scheme is a very ideal example and was used for comparing the performance of the a sum rate with the case of performing beamforming based on the DFT-MRT codebook in FIG. 7.

In the ZFBF with SUS scheme, zero-forcing beamforming (ZFBF) may be performed when each of the user terminals feeds back an SINR value based on the codebook and the base station performs user scheduling based on a SUS algorithm. The ZFBF with SUS has a relatively low complexity compared to the DPC scheme as a linear precoding scheme. However, a random codebook being used may be suitable for a channel of an existing cellular band may be unsuitable for a millimeter wave channel. A sudden degradation in the performance can be verified from the graph of FIG. 7.

In the PU2RC scheme, a codebook index preferred by the user terminals and an SINR value corresponding thereto may be fed back to the base station using a random unitary codebook and the base station may perform scheduling and select a most excellent unitary codebook from among the unitary codebooks and may transmit a signal to each of corresponding user terminals.

Both of the ZFBF with SUS scheme and the PU2RC scheme require a number of RF chains corresponding to a number of antennas and are suitable for a channel of an existing cellular band, for example, 60 GHz, and show a significant degradation in the performance in a millimeter wave channel, for example, 30 GHz or more, 60 GHz, etc. Beamforming using the DFT-MRT codebook proposed herein uses a large number of antennas used at the base station and a limited number of RF chains and is designed based on a characteristic of the millimeter wave channel and shows an excellent sum rate compared to those in the ZFBF with SUS scheme and the PU2RC scheme in a millimeter wave environment. For example, referring to FIG. 7, if the number of transmit antennas is 64 ($N_t$=64) and the number of RF chains is ($N_{RF}$=4, 8, 16, 32, 64), a sum rate is most excellent in the millimeter wave channel environment compared to other limited feedback-based digital beamforming technologies. That is, in the case of DFT-MRT, it can be verified that a relatively high sum rate is achievable in the millimeter wave channel compared to the existing digital technologies using a full RF chain, although the number of RF chains less than the number of transmit antennas are used. Similar to a result of analyzing a scaling law of an asymptotic sum rate, a gradient of loglog U appears as the number U of user terminals increases.

Figure 8:
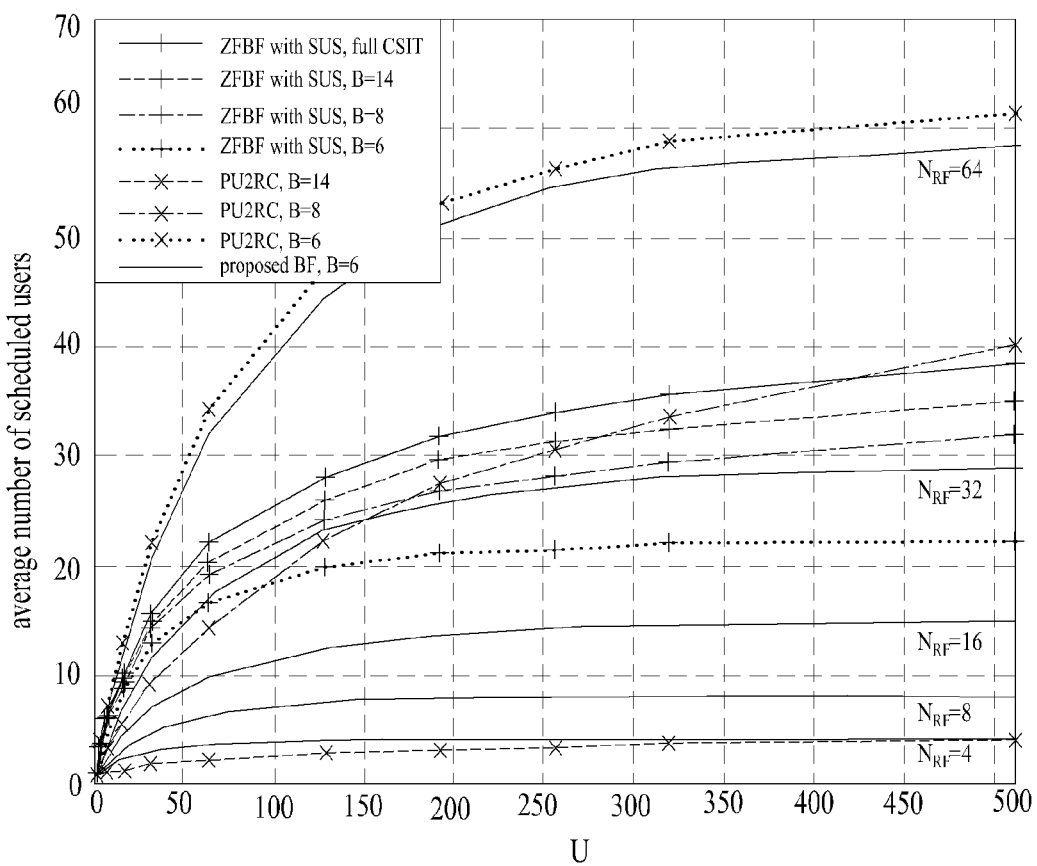
FIG. 8 illustrates an example of a graph showing a comparison between a number of users and a number of scheduled users according to an example embodiment.

FIG. 8 illustrates an example of a graph showing a comparison between a number of users and a number of scheduled users according to an example embodiment.

Referring to FIG. 8, it can be verified that, although the number of RF chains corresponding to a half of the number of transmit antennas, for example, $N_t$64 and $N_{RF}$=32, are used, beamforming based on the DFT-MRT codebook supports the number of user terminals similar to those in the ZFBF with SUS scheme and the PU2RC scheme. Assuming a realistic number of RF chains, that is, assuming that $N_{RF}$=4, 8, 16, a maximum value may be converged only with about 50 to 200 user terminals in a dense urban environment. That is, U=50 to 200.

FIG. 9 illustrates an example of a graph showing a sum rate with respect to an SNR according to an example embodiment.

Referring to FIG. 9, it can be verified that, although the number of RF chains less than the number of transmit antennas are used, beamforming based on the DFT-MRT codebook achieves a relatively high sum rate compared to those in the DPC scheme, the ZFBF with SUS scheme, and the PU2RC scheme.

Curves 901 refer to a case of additionally receiving feedback on effective channel information from user terminals selected through scheduling and performing digital beamforming, and show insignificant effect according to a decrease in the SNR. That is, in the case of using a small number of RF chains in the millimeter wave channel, that is, a low SNR environment due to a high path loss and use of wideband, an additional feedback procedure may not be required to acquire effective channel information of user terminals. That is, the DFT-MRT codebook actively uses a sparse scattering characteristic of the millimeter wave channel and inter-user interference decreases accordingly. Therefore, there is no need to particularly use interference cancellation technology. If a total number of user terminals increases, the inter-user interference further decreases due to a multi-user diversity gain through scheduling.

Figure 10:
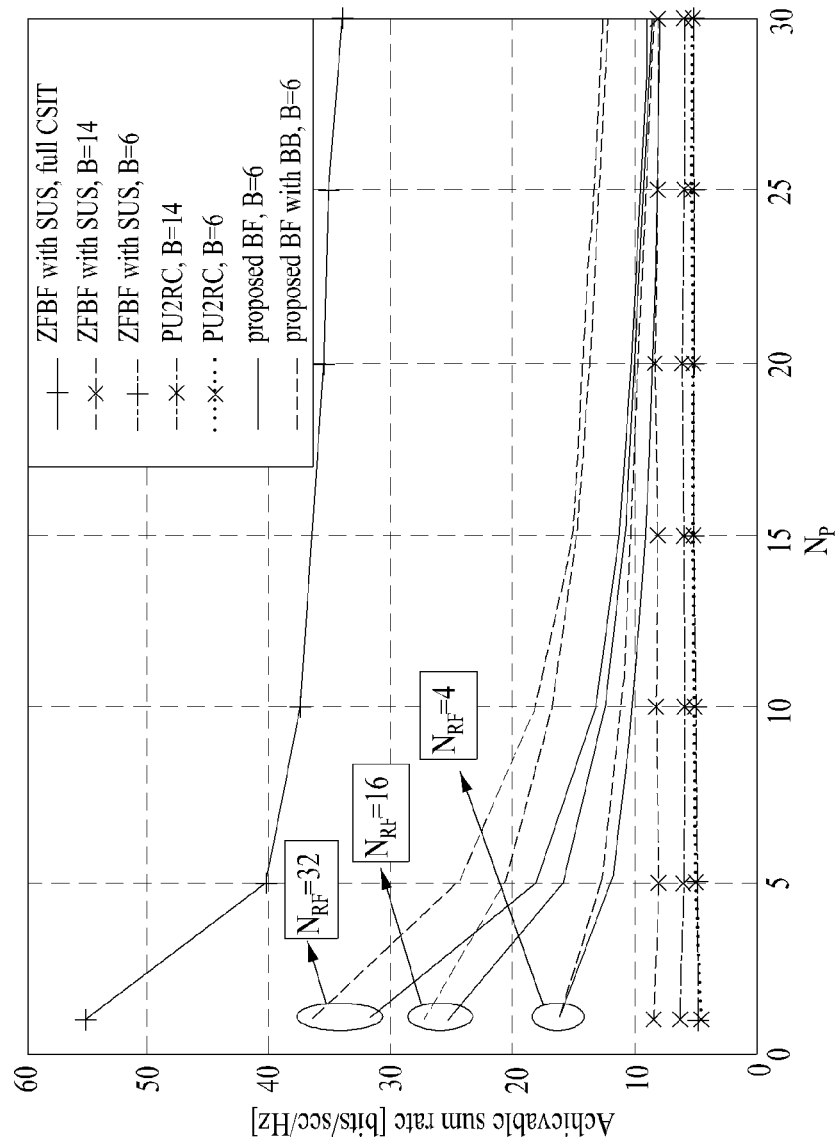
FIG. 10 illustrates an example of a graph showing a sum rate with respect to a number of channel scatters according to an example embodiment.

FIG. 10 illustrates an example of a graph showing a sum rate with respect to a number of channel scatters according to an example embodiment.

As the number of scatters ($N_p$) decreases, a sparse scattering channel like a millimeter wave channel appears and, as $N_p$ increases, a rich scattering channel like an existing cellular band channel appears. Referring to FIG. 10, the sparser the channel distribution, the better the performance of the proposed beamforming based on the DFT-MFT codebook. Also, as channels are sparse and the number of RF chains decreases, inter-user interference decreases and the effect of digital beamforming (baseband beamforming) becomes insignificant. Further, it can be verified that other digital technologies, for example, the ZFBF with SUS scheme and the PU2RC scheme, do not consider a channel characteristic, and thus, has the performance irrelevant to the channel sparsity.

Figure 11:
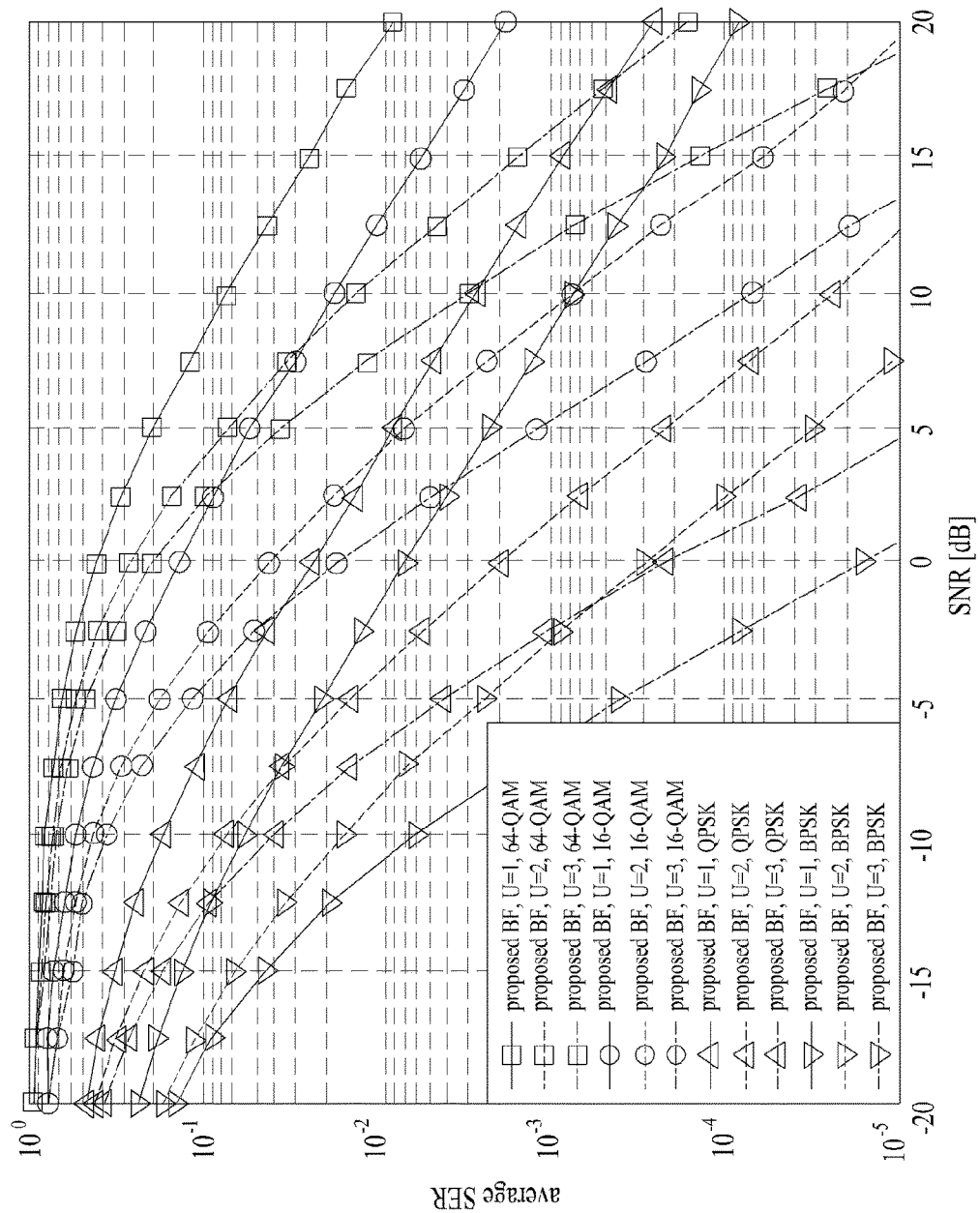
FIG. 11 illustrates an example of a graph showing a transmission error probability in a simulation environment in which a relatively small number of user terminals are present according to an example embodiment.
Figure 12:
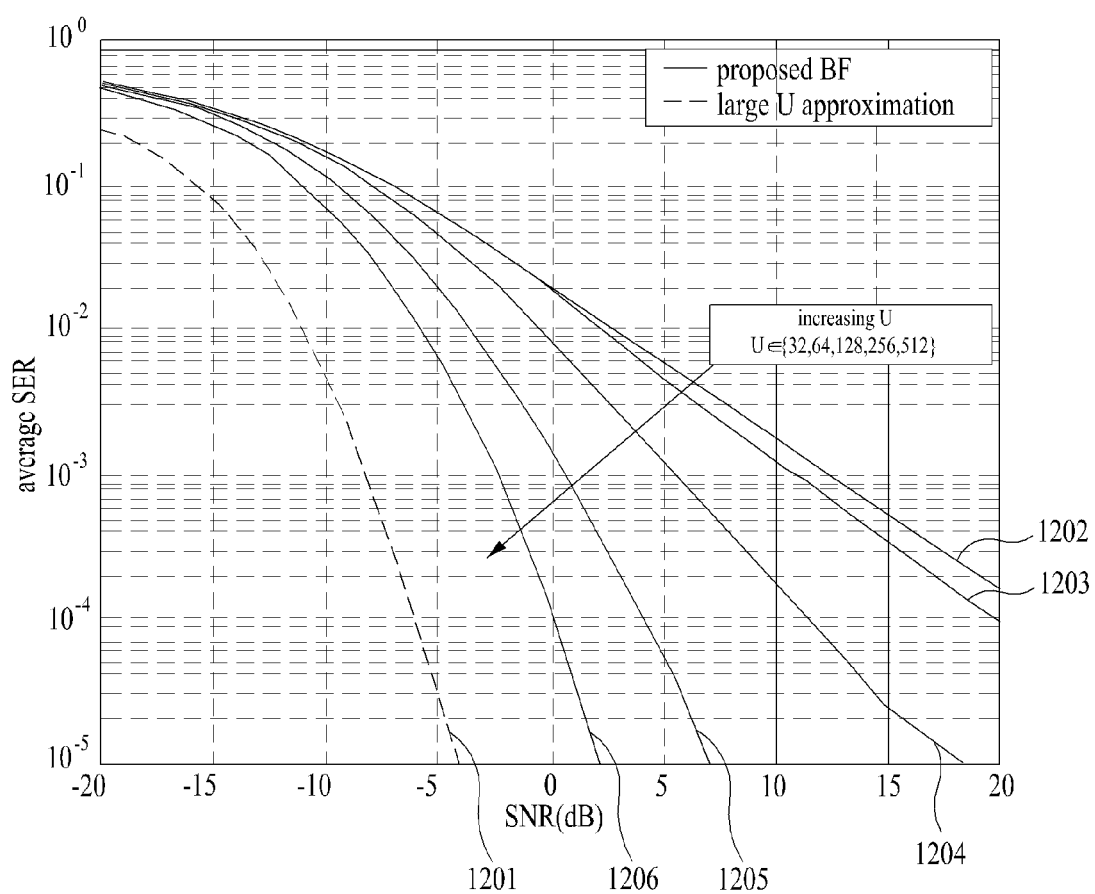
FIG. 12 illustrates an example of a graph showing a transmission error probability in a simulation environment in which a relatively large number of user terminals are present according to an example embodiment.

FIG. 11 illustrates an example of a graph showing a transmission error probability in a simulation environment in which a relatively small number of user terminals are present according to an example embodiment, and FIG. 12 illustrates an example of a graph showing a transmission error probability in a simulation environment in which a relatively large number of user terminals are present according to an example embodiment.

Referring to FIG. 11, a gradient appears as U and the performance is improved gradually as the number of user terminals increases. In FIG. 11, quadrature phase shift keying (QPSK) may indicate 4-qadrature amplitude modulation (QAM) and binary phase shift keying (BPSK) may indicate 2-QAM.

Referring to FIG. 12, a curve 1201 shows an approximation equation of the average SER with respect to a large U environment acquired from the performance analysis. Curves 1202, 1203, 1204, 1205, and 1206 show that the performance is improved gradually according to an increase in the number of user terminals, such as 32, 64, 128, 256, and 512, respectively, and the performance becomes closer to the curve 1201 that is the theoretically acquired approximation equation.

Figure 13:
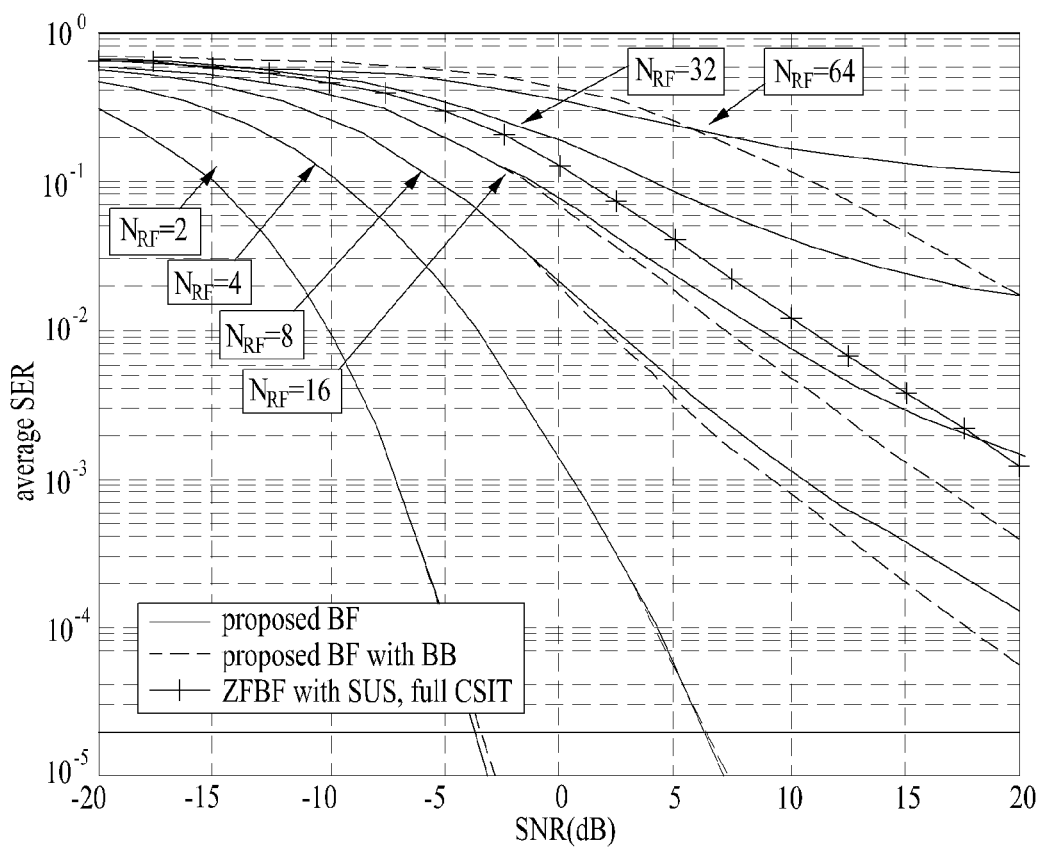
FIG. 13 illustrates an example of a graph showing an average SER with respect to a number of radio frequency (RF) chains according to an example embodiment.

FIG. 13 illustrates an example of a graph showing an average SER with respect to a number of RF chains according to an example embodiment.

Referring to FIG. 13, as $N_{RF}$ increases, transmission power per user terminal decreases, which leads to SNR loss. Also, if $N_t$=64, $N_{RF}$≥4, reliable performance (average SER=$10^{-5}$ or less) is within the range of SNR≤10 dB although digital beamforming (baseband beamforming is not performed (that is, $F^{BB}=I_K$).

Figure 14:
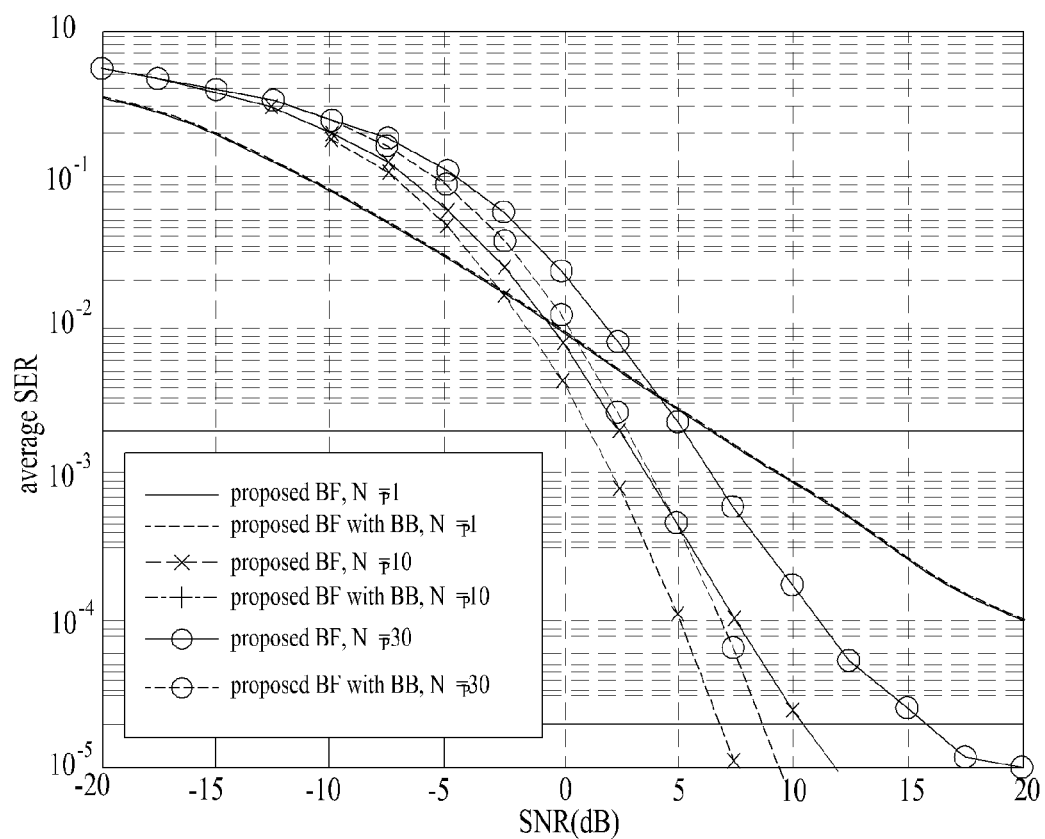
FIG. 14 illustrates an example of a graph showing effect resulting from a number of channel scatters according to an example embodiment.

FIG. 14 illustrates an example of a graph showing effect resulting from a number of channel scatters according to an example embodiment.

Referring to FIG. 14, when digital beamforming is performed by additionally receiving effective channel information fed back from user terminals, a gain increases according to an increase in the number of channel scatters ($N_p$). That is, as $N_p$ increases, inter-user interference increases. Accordingly, unless interference is cancelled, the SER performance may be degraded. Here, if channels are very sparse and $N_p$=1, there is no need to perform digital beamforming.

If $N_p$ exceeds 1 due to a multipath component in a channel, the effect that a gradient of the average SER is improved, that is, a diversity order may be acquired. That is, when a beamforming vector preferred by a user terminal is selected and fed back to the base station, it indicates that a most excellent channel is selected from among various channel path components and a beamforming vector suitable for the selected channel is selected and fed back. Accordingly, the better performance may be acquired.

Figure 15:
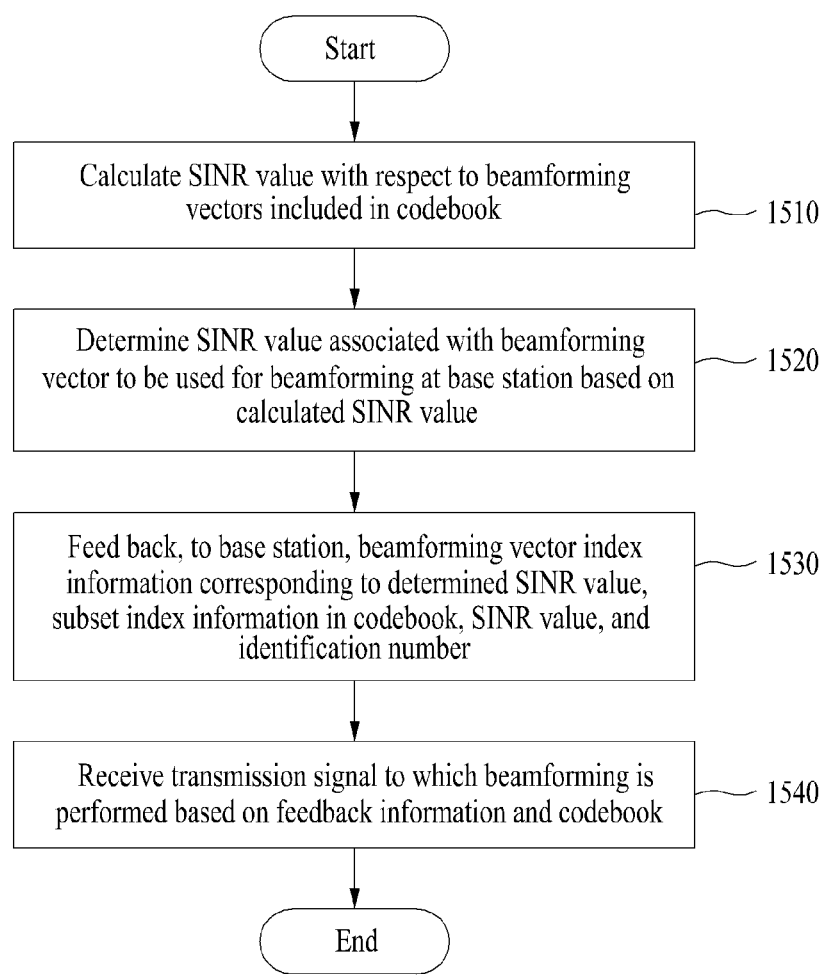
FIG. 15 is a flowchart illustrating an example of a signal processing method of a reception apparatus corresponding to a base station that performs hybrid beamforming according to an example embodiment.
Figure 16:
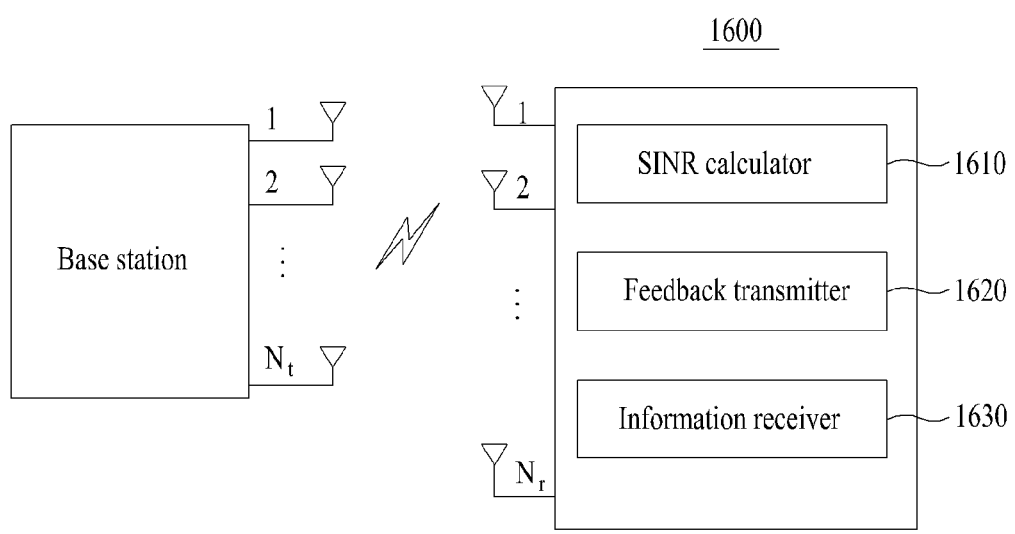
FIG. 16 is a diagram illustrating an example of a reception apparatus corresponding to a base station that performs hybrid beamforming according to an example embodiment.

FIG. 15 is a flowchart illustrating an example of a signal processing method of a reception apparatus corresponding to a base station that performs hybrid beamforming according to an example embodiment, and FIG. 16 is a diagram illustrating an example of a reception apparatus corresponding to a base station that performs hybrid beamforming according to an example embodiment.

Operations 1510 through 1540 of FIG. 15 may be performed by an SINR calculator 1610, a feedback transmitter 1620, and an information receiver 1630 that are components of a reception apparatus 1600 of FIG. 16.

An example in which one user terminal (i.e., reception apparatus) among user terminals, for example, K user terminals selected through scheduling from among a total of user terminals belonging to a specific cell covered by a base station that is the transmission apparatus 300 transmits feedback information for beamforming to the base station will be described with reference to FIGS. 15 and 16. In FIGS. 15 and 16, a process of selecting, at the base station, beamforming vectors for performing digital and analog beamforming based on a codebook shared with the base station and a process aside from a feedback process, for example, a signal processing process of receiving a signal that is digital-and-analog beamformed and then transmitted through a transmit antenna and restoring a source signal correspond to the transmission apparatus. Accordingly, further description related thereto is omitted here.

Referring to FIGS. 15 and 16, in operation 1510, the SINR calculator 1610 may calculate an SINR value with respect to beamforming vectors included in a prestored codebook based on a millimeter wave channel environment.

Here, the codebook shared between the base station and the reception apparatus 1600 refers to a codebook that is designed to maintain the desired satisfactory performance, for example, sum rate when a number of RF chains for analog beamforming is less than a number of transmit antennas, and may be designed to be suitable for, particularly, the millimeter wave channel environment.

In operation 1520, the SINR calculator 1610 may determine an SINR value associated with a beamforming vector to be used for beamforming at the base station based on the calculated SINR value. Here, each of the base station and the reception apparatus 1600 may store in advance the sharing codebook, that is, a DFT-MRT codebook in a storage (not shown).

For example, the SINR calculator 1610 may calculate an SINR value with respect to all of the beamforming vectors included in the codebook. The SINR calculator 1610 may determine a maximum SINR value among the calculated SINR values.

In operation 1530, the feedback transmitter 1620 may feed back, to the base station, feedback information that includes beamforming vector index information corresponding to the maximum SINR value and subset index information in the codebook including the beamforming vector index information. The feedback information may be fed back to the base station by including an identification number of a user terminal and the determined maximum SINR value.

Here, when the channel environment is not the millimeter wave channel environment but a cellular environment, or when the channel environment is a channel in which inter-user interference is greater than or equal to a reference value, the feedback transmitter 1620 may additionally feed back effective channel information that is generated in response to a paging signal received from the base station, in addition to the feedback information. Here, an operation of feeding back the effective channel information is described above in association with the base station and thus further description is omitted here.

In operation 1540, the information receiver 1630 may receive a transmission signal to which digital beamforming and analog beamforming is performed based on the feedback information and the codebook and then transmitted through a transmit antenna of the base station.

Here, when the effective channel information is fed back to the base station, the effective channel information may be used for digital beamforming. Digital beamforming for cancelling inter-user interference may be performed based on the effective channel information and analog beamforming may be performed based on subset index information of the fed back codebook and a beamforming vector of a position corresponding to the subset index information among beamforming vectors included in the codebook. The information receiver 1630 may receive the beamformed signal.

Here, when a channel environment between the base station and the reception apparatus 1600 is a cellular environment or an environment in which inter-user interference is small, for example, a millimeter wave channel environment, there is no need to cancel the inter-user interference and effective channel information may not be fed back accordingly. Therefore, the base station may perform only analog beamforming without performing digital beamforming. The information receiver 1630 may receive a signal to which the digital beamforming is not performed and only the analog beamforming is performed based on the codebook. Here, the codebook may include a desired number of subsets that is calculated based on the number of transmit antennas and the number of RF chains, and each of the subsets may have the number of beamforming vectors corresponding to the number of RF chains. Each of the beamforming vectors may have a dimension of $N_t \times 1$. Here, $N_t$ denotes the number of transmit antennas.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A hybrid beamforming method in a millimeter wave downlink channel performed by a transmission apparatus with respect to at least one user terminal belonging to the transmission apparatus, the method comprising:
    receiving feedback information from each of the at least one user terminal;
    selecting at least one user terminal for transmitting a transmission signal based on the received feedback information;
    performing digital beamforming with respect to the selected at least one user terminal; and
    performing analog beamforming with respect to the selected at least one user terminal based on a prestored codebook,
    wherein the prestored codebook comprises a desired number of subsets calculated based on a number of transmit antennas and a number of radio frequency (RF) chains,
    each of the subsets comprises a number of beamforming vectors corresponding to the number of RF chains,
    the desired number indicates a number acquired by dividing the number of transmit antennas by the number of RF chains, and
    the number of RF chains for analog beamforming is less than or equal to the number of transmit antennas.

2. The method of claim 1, wherein each of the beamforming vectors has a dimension of the number of transmit antennas×1.

3. The method of claim 1, wherein the performing of the digital beamforming comprises performing the digital beamforming based on an identity matrix, in response to the downlink channel being a millimeter wave channel.

4. The method of claim 1, wherein the receiving of the feedback information comprises receiving feedback on effective channel information from user terminals selected from the at least one user terminals in response to the downlink channel being a channel in which inter-user interference is present, and
    the performing of the digital beamforming comprises generating a digital beamforming matrix for cancelling interference between the at least one user terminals based on one of digital linear precoding and non-linear digital precoding using the fed back effective channel information and performing the digital beamforming based on the generated digital beamforming matrix.

5. The method of claim 1, wherein the beamforming vectors are configured to form a beam pattern at a same interval that is calculated based on the number of subsets and the number of transmit antennas.

6. The method of claim 1, wherein the receiving of the feedback information comprises receiving, from the user terminal, an identification number of the user terminal, a signal-to-interference noise ratio (SINR) value selected at the user terminal, beamforming vector index information corresponding to the selected SINR value, and subset index information in the prestored codebook, and
    the beamforming vectors are beamforming vectors at positions corresponding to the subset index information in the prestored codebook and the beamforming vector index information.

7. The method of claim 1, wherein the selecting of the user terminal comprises grouping user terminals having the same beamforming vector index information and subset index information in the codebook based on the received feedback information into a group, and selecting the user terminal for transmitting the transmission signal based on an SINR of each of the user terminals belonging to the group.

8. The method of claim of claim 1, wherein the performing of the analog beamforming comprises performing analog beamforming of controlling a phase of a complex signal aside from a magnitude of the complex signal based on a phase shifter element.

9. A transmission apparatus for performing hybrid beamforming in a millimeter wave downlink channel with respect to at least one user terminal, the transmission apparatus comprising:
    an information transceiver configured to receive feedback information from each of the at least one user terminal;
    a scheduler configured to select at least one user terminal for transmitting a transmission signal based on the received feedback information;
    a digital beamforming performer configured to perform digital beamforming with respect to the selected at least one user terminal; and
    an analog beamforming performer configured to perform analog beamforming with respect to the selected at least one user terminal based on a prestored codebook,
    wherein the prestored codebook comprises a desired number of subsets calculated based on a number of transmit antennas and a number of radio frequency (RF) chains,
    each of the subsets comprises a number of beamforming vectors corresponding to the number of RF chains,
    the desired number indicates a number acquired by dividing the number of transmit antennas by the number of RF chains, and
    the number of RF chains for analog beamforming is less than or equal to the number of transmit antennas.

10. The transmission apparatus of claim 9, wherein each of the beamforming vectors has a dimension of the number of transmit antennas×1.

11. The transmission apparatus of claim 9, wherein the digital beamforming performer is configured to perform the digital beamforming based on an identity matrix, in response to the downlink channel being a millimeter wave channel.

12. The transmission apparatus of claim 9, wherein the information transceiver is configured to receive feedback on effective channel information from user terminals selected from the at least one user terminals in response to the downlink channel being a channel in which inter-user interference is present, and
    the digital beamforming performer is configured to generate a digital beamforming matrix for cancelling interference between the user terminals based on one of digital linear precoding and non-linear digital precoding using the fed back effective channel information and to perform the digital beamforming based on the generated digital beamforming matrix.

13. The transmission apparatus of claim 9, wherein the beamforming vectors are configured to form a beam pattern at a same interval that is calculated based on the number of subsets and the number of transmit antennas.

14. The transmission apparatus of claim 9, wherein the information transceiver is configured to receive, from each of the at least one user terminal, an identification number of the at least one user terminal, a signal-to-interference noise ratio (SINR) value selected at the at least one user terminal, beamforming vector index information corresponding to the selected SINR value, and subset index information in the prestored codebook.

15. The transmission apparatus of claim 9, wherein the scheduler is configured to group user terminals having the same beamforming vector index information and subset index information in the prestored codebook based on the received feedback information into a group, and to select the at least one user terminal for transmitting the transmission signal based on an SINR of each of the at least one user terminals belonging to the group.

16. The transmission apparatus of claim 9, wherein the analog beamforming performer is configured to comprise phase shift elements for controlling a phase of a complex signal aside from a magnitude of the complex signal.

17. A hybrid beamforming method of a reception apparatus, the method comprising:
   calculating a signal-to-interference noise ratio (SINR) value with respect to beamforming vectors included in a prestored codebook based on a millimeter wave channel environment;
   determining an SINR value associated with a beamforming vector to be used for beamforming at a base station based on the calculated SINR value;
   transmitting, to the base station, feedback information that comprises beamforming vector index information corresponding to the determined SINR value, subset index information in the prestored codebook, the determined SINR value, and an identification number of the reception apparatus; and
   receiving, from the base station, a transmission signal to which digital beamforming and analog beamforming is performed based on the prestored codebook and the feedback information,
   wherein the prestored codebook comprises a desired number of subsets calculated based on a number of transmit antennas and a number of radio frequency (RF) chains,
   each of the subsets comprises a number of beamforming vectors corresponding to the number of RF chains,
   the desired number indicates a number acquired by dividing the number of transmit antennas by the number of RF chains, and
   the number of RF chains for analog beamforming is less than or equal to the number of transmit antennas.

* * * * *